(12) United States Patent
Athale

(10) Patent No.: US 6,501,869 B1
(45) Date of Patent: Dec. 31, 2002

(54) OPTICAL SWITCHING SYSTEM

(75) Inventor: Ravindra Athale, Burke, VA (US)

(73) Assignee: George Mason University, Fairfax, VA (US)

( * ) Notice: Subject to any disclaimer, the term of this patent is extended or adjusted under 35 U.S.C. 154(b) by 133 days.

(21) Appl. No.: 09/805,428

(22) Filed: Mar. 14, 2001

Related U.S. Application Data

(60) Provisional application No. 60/190,095, filed on Mar. 20, 2000.

(51) Int. Cl.[7] .................................................. G02B 6/26
(52) U.S. Cl. .............................. 385/18; 385/22; 385/17; 385/20
(58) Field of Search ....................................... 385/17–22

(56) References Cited

U.S. PATENT DOCUMENTS

| | | | | |
|---|---|---|---|---|
| 5,841,917 | A | * 11/1998 | Jungerman et al. | ........... 385/15 |
| 6,385,364 | B1 | * 5/2002 | Abushagur | ................... 385/16 |
| 6,430,333 | B1 | * 8/2002 | Little et al. | .................... 385/14 |
| 6,453,083 | B1 | * 9/2002 | Husain et al. | ................. 385/17 |

* cited by examiner

Primary Examiner—Hung N. Ngo
(74) Attorney, Agent, or Firm—David G. Grossman

(57) ABSTRACT

An optical switch is disclosed which includes hollow waveguide structures having cantilevered beam deflectors to couple light out of the waveguide plane. An array of such waveguides with deflector combinations may be fabricated on a substrate. By combining substrates, devices such as all-optical cross bar switches, image display and scanning devices may be created.

29 Claims, 20 Drawing Sheets

OPTICAL SWITCHING SYSTEM

CROSS-REFERENCE TO RELATED APPLICATIONS

The present application claims the benefit of provisional patent application Ser. No. 60/190,095 to ATHALE, filed on Mar. 20, 2000, entitled "Optical Switching Systems Comprising Hollow Optical Waveguides and Micro-Mechanical Deflectable Mirror", which is hereby incorporated by reference.

BACKGROUND OF THE INVENTION

This invention generally relates to the field of optical switching. More specifically, the present invention relates to optical systems comprising hollow optical waveguides and micro-mechanical deflectable mirrors.

Optical switching is a fundamental operation that is useful in optical communications, optical memory, and optical displays. In its most basic form, optical switching involves spatial redirection of information-carrying optical waves. FIG. 1 (prior art) shows a simple and generic optical switch 100. This one-input—two-output optical switch directs input optical signal 101 to one or both of the two optical output ports, output 1 102 and output 2 103, under the command of a control signal 104.

This switch may be generalized to N-output ports. FIG. 2 (prior art) illustrates how a I×N switch 200 may be constructed from multitude of 1×2 optical switches 100. In this particular illustration, N equals 6. In the I×N configuration, a switch may be used in a signal distribution network. Alternatively, by sequentially switching the optical signal to the N output ports that are arranged in a 2-D spatial array, the switch may be used in a display device where the input optical signal contains image information. The same switch may also be used to access different spatial locations in an optical memory.

A basic switch 300 may also be generalized to contain several input ports as illustrated in FIG. 3 (prior art). Again, a simple switch may contain two input ports, input 1 301 and input 2 302, as well as two output ports, output 1 303 and output 2 304. This may be a generalization of switch 100 shown in FIG. 1. Under the direction of an external control signal 305, each of the input signals, 301 and 302 may be directed to one or both of the output ports, 303 and 304 respectively. When a single input is distributed to both output ports, the operation is called "broadcast or fan-out." When both input signals are directed to a single output port, the operation is termed "concentration or fan-in." When each output port receives one or the other of the input signals, the operation is termed "permutation".

This switch may be generalized when the number of input signals and output ports exceed two. In general, the number of input signals, say M, and the number of output ports, say N, do not have to be equal. Such an M×N optical switch forms the heart of an optical switching network in a communication system or the interconnection fabric inside a high performance computing system. Again, one skilled in the art can easily see how such an M×N optical switch may be constructed from M optical,switches, each of which is a I×N switch of the type shown in FIG. 2. Corresponding output lines from each of the M such switches may be combined to generate one of N output lines.

Performance parameters associated with such M×N optical switches includes but is not limited to: the size of the switch (values of M and N); the bandwidth of the optical signals the switch can carry; the rate at which the signals can be redirected or the switch can be reconfigured; the optical efficiency of the switch (loss); the isolation between ports (cross talk); the ability to perform a broadcast operation; the ability to handle optical signals of different formats (analog, digital, AM, FM, PM, multiple wavelengths); the complexity of the control signal interface; the ease of interfacing to optical fibers; the overall size; the weight; the power consumption; the mechanical stability; and the ease of manufacturing. Each performance parameter is not equally important to different applications. In fact, some of them may not be relevant to certain applications at all. For example, the ease of interfacing to optical fibers may not be relevant to display applications. To the extent that some of these parameters may not be optimized simultaneously, the trade-off between them may be governed by the specific applications for which they are being designed.

Given the widespread applications of optical switches, it is not surprising that over the years a number of different designs have been proposed and implemented. These designs primarily fall in two categories: designs where light propagates in guided wave structures inside the switch and designs where light propagates in free space inside the switch.

Guided Wave Optical Switches

FIG. 4A and FIG. 4B (prior art) show schematic diagrams of a simple 1×2 optical switch involving mechanical movements and using optical fibers. As illustrated, the type of switch may have an input fiber 402 and two output fibers 404 and 406, switched by mechanical movements 410 and 412. FIG. 4A shows input fiber 402 switched to output fiber 404 and FIG. 4B shows input fiber 402 switched to output fiber 406. This type of switch may be extremely simple to construct, have low loss, have very high isolation between ports, and carry full bandwidth available to optical fibers regardless of the format. However, this switch may be slow to reconfigure due the difficulty of moving a large mass, may not allow broadcast and may not be easily extendable to an M×N switch. Still, such switches, due to their simplicity have found uses in fiber optic networks.

A second type of guided wave switches based on optical propagation in planar (integrated optic) waveguides and dynamic directional couplers is illustrated in FIG. 5 (prior art). This schematic diagram of a 1×2 switch is based on a directional coupler. Light from a single mode waveguide 520 may be coupled into another single mode waveguide 522 that is brought in close proximity, allowing interaction between each waveguide, 520 and 522, via evanescent field coupling. By controlling the phase of the evanescent wave in the intervening region using a control mechanism 510, the coupling efficiency may be modulated between 0 and 100% (for ideal devices). If the inputs 502 and 506 to both waveguides contain optical signals, the same switch may be made to behave like a 2×2-permutation switch, where the outputs are illustrated as 504 and 508. The phase of the evanescent wave may be controlled at the control mechanism 510 via electrooptic effect or thermooptic effect. Several such 2×2 switches may be combined in a tree-like structure to realize an M×N permutation switch. Such integrated optic crossbar switches have been commercially available from a number of companies including Ericsson of Stockholm, Sweden, Lucent of Murray Hill, N.J., and Worldwide Telecommunications Corporation (NTT) of Tokyo, Japan. These switches may be compact, switched extremely fast (if electrically controlled), have good isolation, and carry high bandwidth optical signals. However, these switches may also be difficult to couple to fibers, be environmentally sensitive, not achieve broadcast functionality, and not extend easily to large sizes without consuming a large integrated optic chip area.

FIG. 6 (prior art) illustrates an experimental approach to integrated optical switches utilizing electrooptically-activated Bragg reflectors embedded into waveguide junctions. Two one-dimensional arrays including a first input optical waveguide 610, a second input optical waveguide 612, a first output optical waveguide 614, and a second output optical waveguide 616 may be arranged orthogonally oriented to each other in a single plane as shown in FIG. 6. With no electric field activating a grating (620, 622, 624, or 626) at a junction, light injected in a waveguide may continue propagating along it. When the grating is activated, light may be scattered into the output waveguide that crosses the input waveguide. FIG. 6 shows this switch structure schematically. The figure shows a 2×2 switch where input signal 1 602 is coupled to output port B 608 and input signal 2 604 is coupled to output port A 606. This is achieved by activating gratings 624 and 622, while leaving gratings 620 and 626 deactivated.

The advantages and disadvantages of this switch design are somewhat similar to the design shown in FIG. 4. Since this design involves waveguides at right angles, it may lead to a more compact switch. However, the cross talk characteristics may be distinctly inferior to the previous design and the build up of cross talk may limit the size of the switch.

Free Space Optical Switches

FIG. 7 (prior art) is a diagram of a free space optical switches. With free space optical switch designs, light beams propagate in free space without any guiding structures. Usually such systems employ lenses to keep the divergence of optical beams in check. An M×N free space optical cross bar switch is easiest to understand conceptually.

FIG. 7 does not show any intervening lenses. The lenses may consist of anamorphic (cylindrical) lenses that perform imaging operations along one direction and collimation or focusing along the orthogonal axis. The two-dimensional switch consists of binary amplitude Spatial Light Modulators (SLM) 704, where each of the 4×6 array of pixels may be transmitting or opaque. By controlling the transmittance of each of the pixels, any one of the 4 inputs 702 may be connected to any of the six outputs 706. This fully generalized switch may perform an arbitrary permutation, broadcast, or perform fan-in operation(s). This switch however, usually has low throughput (high loss). Each input channel is broadcast to all output channels. In a permutation operation, only one of the 6 pixels in a row in FIG. 7 above will be transmitting, hence the rest of the light is lost. This light loss is directly proportional to the size of the switch and hence for large size switches (>100), the losses may be unacceptable. A second undesirable feature is the slow switching speed of most 2-D SLM's. This limits the reconfiguration time for the switch. The switch is relatively bulky and may require coupling from and to fibers. The generation and delivery of control signals may also pose difficulty. None-the-less, several such switches have been built and demonstrated by using ferroelectric liquid crystal SLM's. Another realization of this overall architecture employs fibers, 1-N fiber splitters and combiners and semiconductor optical amplifiers as amplifying switches that control each cross point. The resulting system may be compact since fiber splitters now replace bulky lenses allowing easy interfacing to fibers. Switching the semiconductor optical amplifiers very fast, may overcome reconfiguration speed limitations. The gain provided by the optical amplifiers may overcome broadcast loss, improving overall throughput efficiency. However, semiconductor optical amplifiers are expensive, hard to couple to fibers and are polarization sensitive. The cross bar switch based on semiconductor optical amplifiers may therefore be limited to small sizes (<16).

One way to avoid broadcast loses may be to use light deflection switches instead of light modulation switches. One example of such a light deflection switch is an acoustooptic device. In an acoustooptic device, a traveling phase grating is created within a transparent crystal in response to applied RF signal to a piezoelectric transducer attached to one end of the crystal. The frequency of the grating and hence the deflection angle is controlled by the frequency of the RF drive signal. FIG. 8 (prior art) shows a schematic diagram of such a cross bar optical switch 800.

The diffraction efficiency of the grating as well as the coupling efficiency at the output end into a fiber together determines the throughput efficiency of this switch. The deflection efficiencies may be quite high and indeed acoustooptic beam deflectors are routinely used in image scanning applications. The traveling nature of the gratings in the acoustooptic device may pose problems. A way around this utilizes multi-channel acoustooptic devices with a separate channel and transducer for each input channel. This may make the whole system bulky and power consuming. Therefore its use in communication and computer interconnection switching is not widely accepted.

A schematic diagram of another free space optical cross bar design employing the basic architecture shown in FIG. 6 is shown in FIG. 9 (prior art). The main switching element is a micro mirror fabricated out of thin membranes using Micro Electro Mechanical (MEMs) technology. Microlenses 940 collimate optical signals (possibly provided by single mode fibers) into small area beams. These beams travel parallel to the MEMs substrate. The MEMs substrate contains an array of micro-mirrors 920 and 930 that may move into the path of incoming optical beams. When activated, the movement could be out of the plane where the mirrors pop up and lie in the plane when deactivated. Alternatively, the mirrors could slide into a position to intercept the beam when activated and slide out when deactivated. The micro-mirrors may reflect the input optical beams to the appropriate output port. In the current illustration, micro-mirrors 920 are activated and micro-mirrors 930 are deactivated creating the permutation pattern corresponding to: input 1 902 to output C 956, input 2 904 to output B 954, input 3 906 to output D 958, and input 4 908 to output A 952. This design is compact and readily interfaced to fiber. Also, this design is passive optical, meaning that the optical signals may be correctly switched regardless of the bandwidth or format. Reconfiguration speeds could be moderate, into the 100 kHz range. Scalability of this design may be an issue. A primary limitation may be cross talk between channels due to diffractive spreading of small area optical beams. If the beam diameter is increased to reduce diffractive spreading, the channel density may decrease and the propagation distance may increase, thereby increasing the diffractive spreading. The alignment of the lenses and optical fibers and output coupling into single mode optical fibers may also be an issue.

What is needed is an optical switching system that is compact; robust; efficient; easily scalable to greater than 100 optical channels; accepts a multitude of formats, bandwidths and wavelengths of optical signals; integrates control signals easily; is easy to manufacture; has low cross-talk; and easily interfaces to optical fibers.

BRIEF SUMMARY OF THE INVENTION

One advantage of the invention is that it allows for the construction of a compact, robust and efficient optical switch.

Another advantage of this invention is that it provides for an optical switch that may be easily scalable to greater than 100 optical channels.

Yet a further advantage of this invention is that it accepts a multitude of formats, bandwidths, and wavelengths of optical signals.

Yet a further advantage of this invention is that it integrates control signals easily, is easy to manufacture, has low cross-talk; and is easy interface to optical fibers.

To achieve the foregoing and other advantages, in accordance with all of the invention as embodied and broadly described herein, an optical switch comprising a plurality of optical waveguide switches. Each of the plurality of optical waveguide switches comprise an optical waveguide. The optical waveguide includes a substrate having a hollow channel having a beginning and an end running through the substrate, a plate residing atop the hollow channel, an input aperture at the beginning of the hollow channel, and an output aperture at the end of the hollow channel. The optical waveguide also includes a plurality of micro-mechanical deflectable cantilevered beam mirrors formed in the plate and oriented along the optical waveguide. The micro-mechanical deflectable cantilevered beam mirrors have a deflected position where the micro-mechanical deflectable cantilevered beam mirrors are operably deflected out of the plane of the plate into the hollow channel for intercepting an optical signal and deflecting that optical signal out of the plane of the hollow waveguide, and a non-deflected position where the micro-mechanical deflectable cantilevered beam mirrors remain in the plane of the plate. A plurality of mirror apertures are operably formed when each of the micro-mechanical deflectable cantilevered beam mirrors are in their deflected position. The optical switch also comprises at least two layers, each of the layers comprising at least one of the optical waveguide switches; an optical waveguide switch stack comprising at least two layers stacked so that at least one of the plurality of mirror apertures from each of the optical waveguide switches on adjacent the layers are aligned; at least one input optical interface, each of the input optical interfaces attached to one of the input apertures for receiving an optical signal from at least one external source; and at least one output optical interface, each of the output optical interfaces attached to one of the output apertures for the optical signal to pass from the optical switch to at least one external receiver.

In yet a further aspect of the invention, an optical switch wherein the plate is a membrane.

In yet a further aspect of the invention, a cross connect switch where one of the layers is a first layer and where at least one of one of the optical waveguide switches on the first layer is a multitude of the optical waveguide switches aligned in parallel. Another layers is a second layer where at least one of one of the optical waveguide switches on the second layer is a multitude of the optical waveguide switches aligned in parallel. The first layer and the second layer are adjacent layers. The first layer and the second layer are aligned so that the optical waveguide switches on the first layer are perpendicular to the optical waveguide switches on the second layer.

In yet a further aspect of the invention, an optical switch wherein the micro-mechanical deflectable cantilevered beam mirrors are operably deflected in a predetermined pattern that is synchronous with a time modulated optical signal. The time modulated optical signal may be a display signal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The present invention is an optical switching system that is compact; robust; efficient; easily scalable to greater than 100 optical channels; accepts a multitude of formats, bandwidths and wavelengths of optical signals; integrates control signals easily; is easy to manufacture; has low cross-talk; and easy interface to optical fibers. It comprises hollow optical waveguides and micro-mechanical deflectable mirrors, methods of use thereof, methods of making, etc. Such systems are useful as switches, image scanners, image viewers, display devices, data conduits, and the like.

Hollow Waveguides

In accordance with a preferred embodiment of the present invention, a hollow waveguide is utilized to guide light. Most commonly used optical structures for guiding light (whether fibers or planar channel guides) involve a central region of higher refractive index (called core) and a surrounding low refractive index region called cladding. Total internal reflection may take place at the interface when light is incident from the higher index side with an angle greater than the critical angle. This total internal reflection preferably keeps the light confined to the higher refractive index region or the core. However, at longer wavelengths (such as 10.6 micron output of $CO_2$ laser that is so widely used in manufacturing or at microwave frequencies) it is often difficult to find and fabricate such structures with controlled refractive indices. In those regions, a hollow waveguide structure may be employed. Here the guiding region may contain gases such as air while ordinary reflection at the interface confines the electromagnetic radiation (microwave or infrared). Such guiding structures are often lossy and hence used when propagation distances are relatively short (few meters) when compared to typical distances involved in communication systems (a few kilometers to thousands of kilometers). Such waveguide structures, however, have not been explored by those skilled in the art for visible or near infrared wavelengths. Hollow waveguide structures may be practical to build and use since metallic coatings have a broadband reflectivity, and multi-layer dielectric coatings with very high efficiency exist in the wavelength regions of interest.

Figure 10:
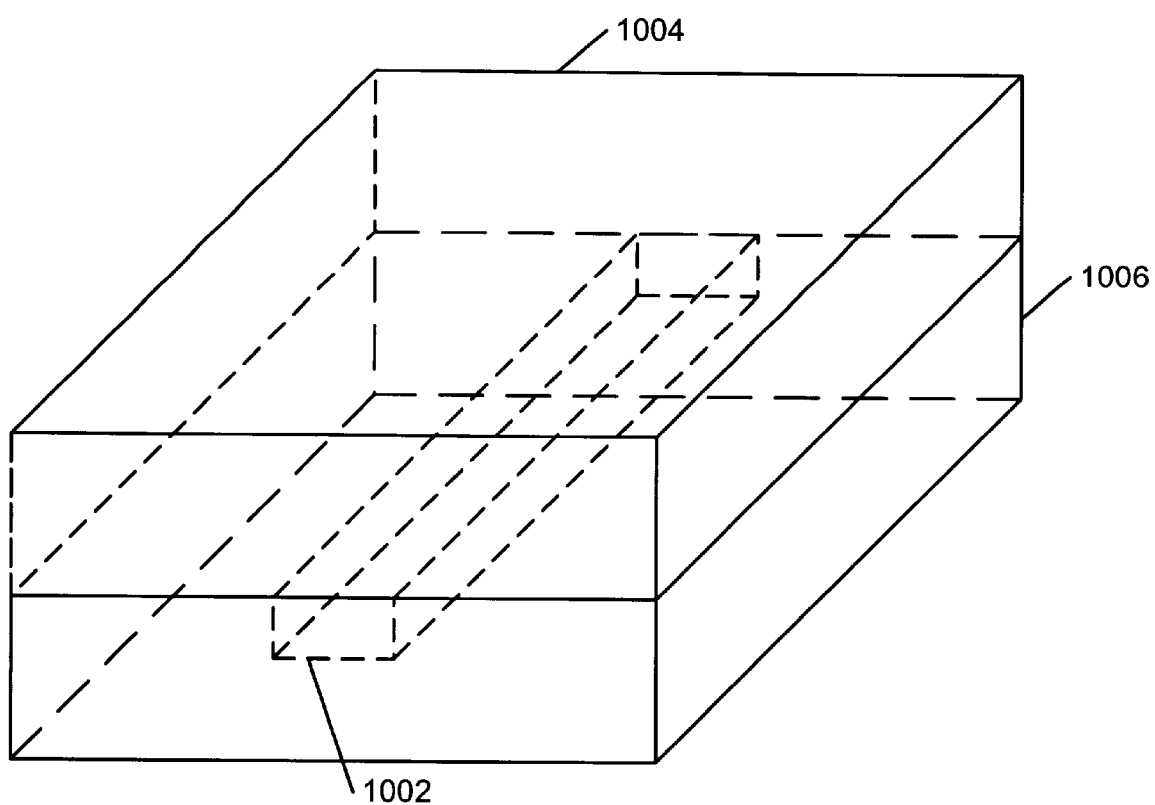
FIG. 10 shows a diagram of a hollow wave guide per an embodiment of the invention.

FIG. 10 shows a diagram of a hollow waveguide per a preferred embodiment of the invention. The waveguide may be constructed by: etching a rectangular channel 1002 in a bottom substrate 1006, coating the inside of the channel 1002 with a metallic or dielectric reflective coating and then covering the open top with a top plate 1004 having a similar reflective coating. It should be noted that the substrate 1006 and the top plate 1004 material could be transparent or opaque, metallic or insulating, single crystal or amorphous. It should also be noted that even though the diagram shows a top plate 1004 with comparable thickness to the bottom substrate 1006, in practice the top plate 1004 could be any thickness including a very thin membrane without affecting the operation of the hollow waveguide. The membrane could be constructed by depositing a film such as a polyimide film on a substrate such as a silicon substrate. If the dimensions of the channel 1002 are far greater than the wavelength of light, the propagation may be adequately modeled by ray optics. Otherwise, electromagnetic wave equations may have to be solved as a boundary value problem leading to discrete propagation modes.

Figure 11A:
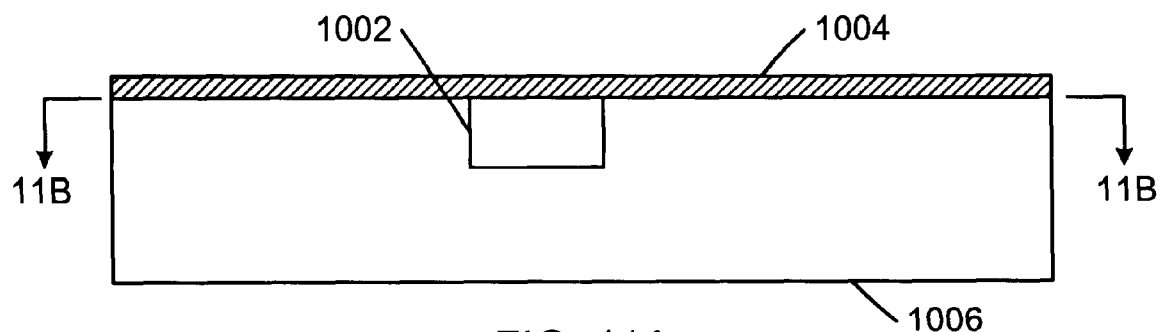
FIG. 11A shows a forward view of a waveguide as per an embodiment of the present invention.
Figure 11B:
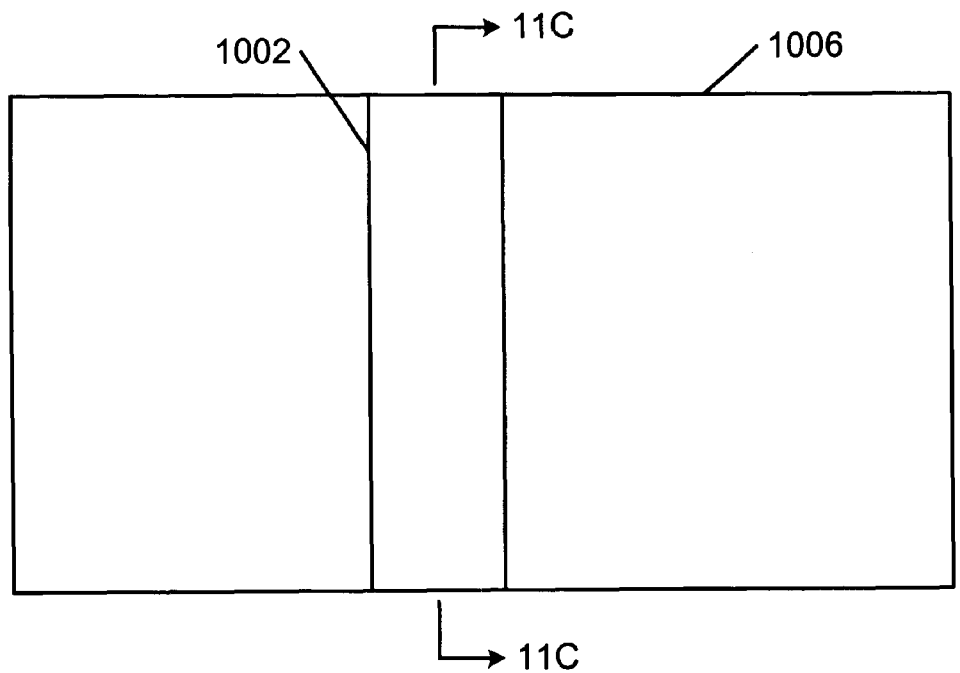
FIG. 11B shows a top view of the bottom substrate shown in FIG. 11A as per an embodiment of the present invention.
Figure 11C:
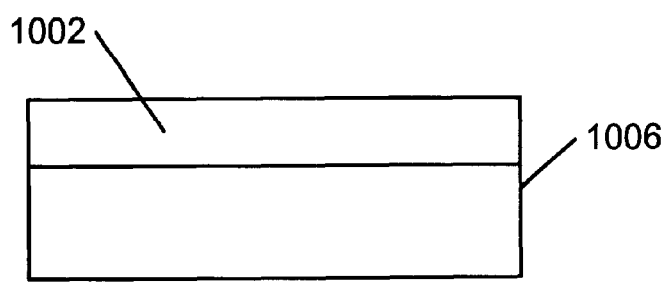
FIG. 11C shows a side view of a cutaway of a bottom substrate shown in FIG. 11B as per an embodiment of the present invention.

FIGS. 11A, 11B, and 11C show three views of the same device illustrated in FIG. 10 with a thin membrane as the top plate 1004. FIG. 11A is a forward view of the waveguide. FIG. 11B is a top view of cutaway 11B—11B of the bottom substrate 1006. FIG. 11C is a side view of cutaway 11C—11C of the bottom substrate 1006.

Cantilevered Beam Deflector

Figure 12A:
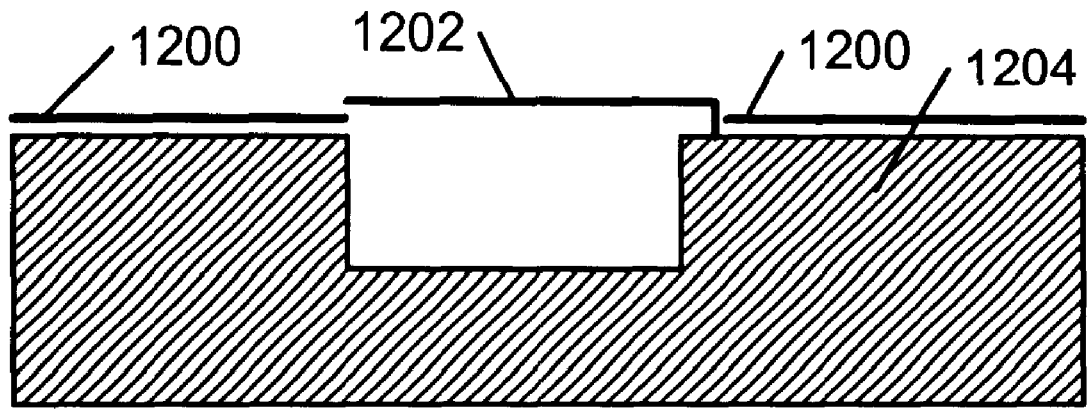
FIG. 12A shows a basic structure of a cantilever beam deflector in an undeflecting position as per an embodiment of the present invention.
Figure 12B:
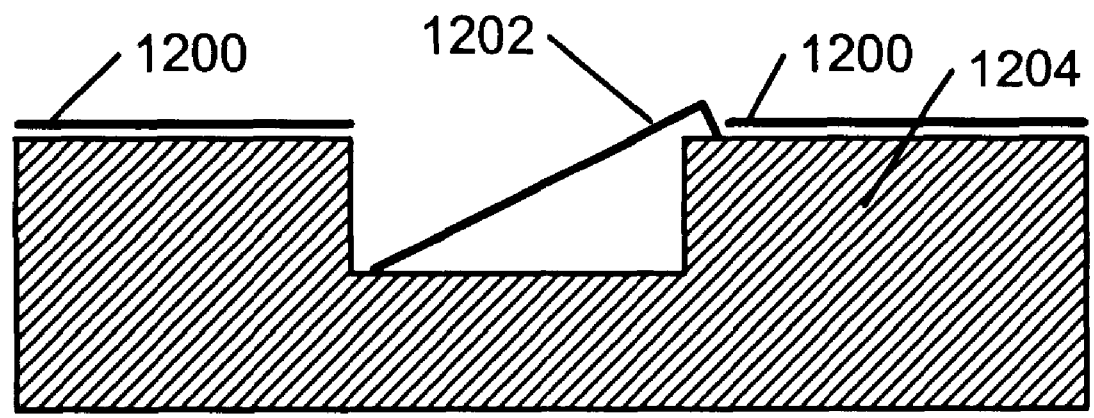
FIG. 12B shows a basic structure of a cantilever beam deflector in a deflecting position as per an embodiment of the present invention.

FIGS. 12A and 12B show a basic structure of a cantilever beam deflector 1202. FIG. 12A shows the cantilever beam in an undeflected position and FIG. 12B shows the cantilever beam in a deflected position. The top membrane 1200 of the hollow.waveguide 1206 may be patterned to create a basic switch.

This light deflector design may be adapted for the hollow waveguide 1206 such that the cantilevered beam 1202 is oriented along the hollow waveguide 1206. In an undeflected position (shown in FIG. 12A), the cantilever beam 1202 provides a portion of the top membrane of the hollow waveguide 1206, thus ensuring the confinement of the light beam inside. When the cantilevered beam 1202 is deflected downwards (shown in FIG. 12B), the cantilevered beam 1202 may intercept a propagating light beam and deflect it out of the plane of the hollow waveguide 1206. If the deflection angle is 45 degrees, the deflected light beam may be perpendicular to the waveguide plane. It should be noted that when the cantilevered beam 1202 is deflected down, an open window is preferably created in the hollow waveguide 1206 and the light reflected from the cantilevered beam 1202 may emerge perpendicular to the waveguide plane. This operation is shown again in three views of another hollow waveguide as per the present invention in FIG. 13.

Figure 1:
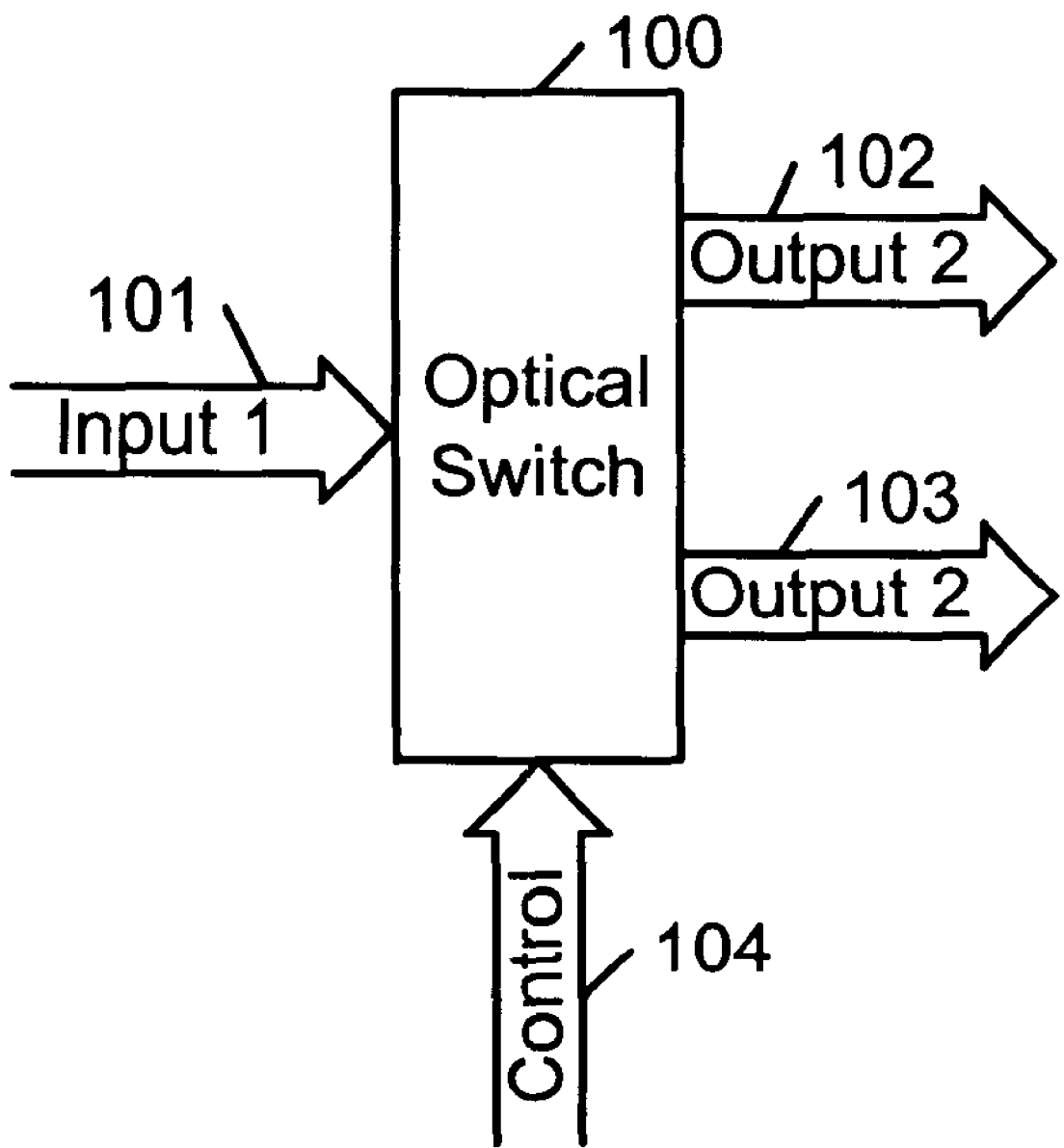
FIG. 1 (prior art) is a block diagram of a simple and generic optical switch.
Figure 13A:
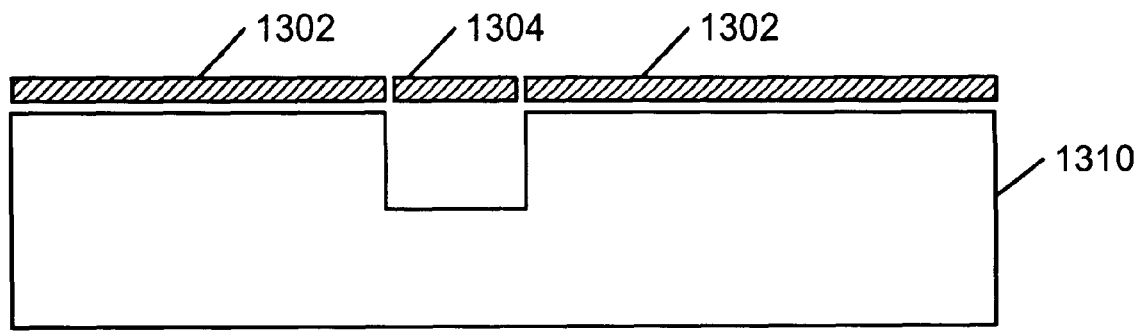
FIG. 13A shows a forward view of an optical switch structure as per an embodiment of the present invention.
Figure 13B:
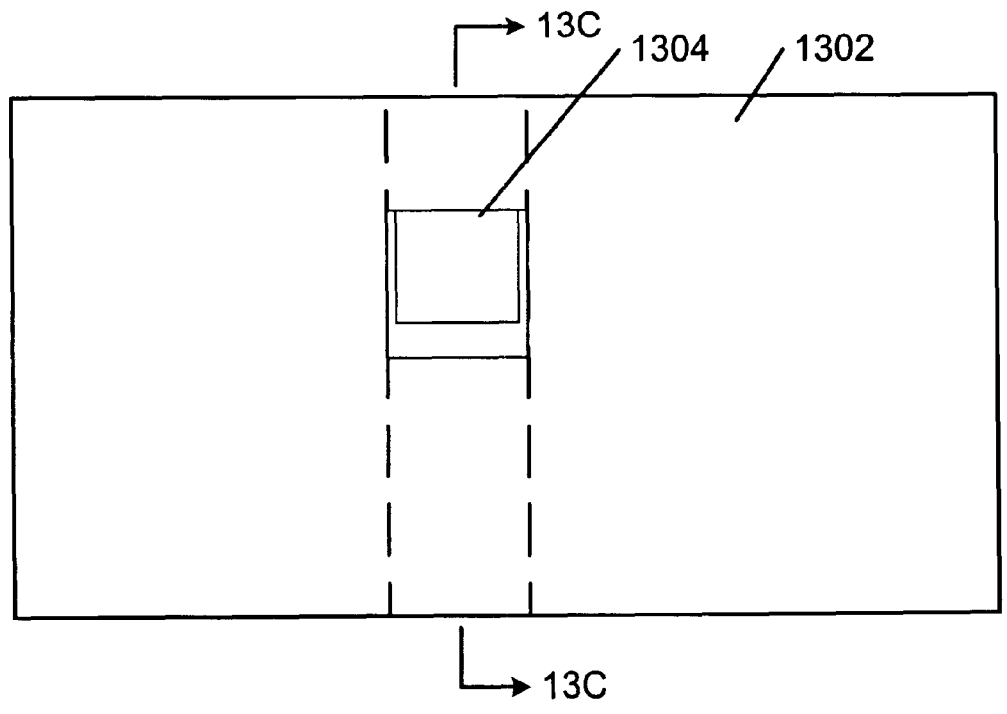
FIG. 13B shows a top view of an optical switch structure shown in FIG. 13A as per an embodiment of the present invention.
Figure 13C:
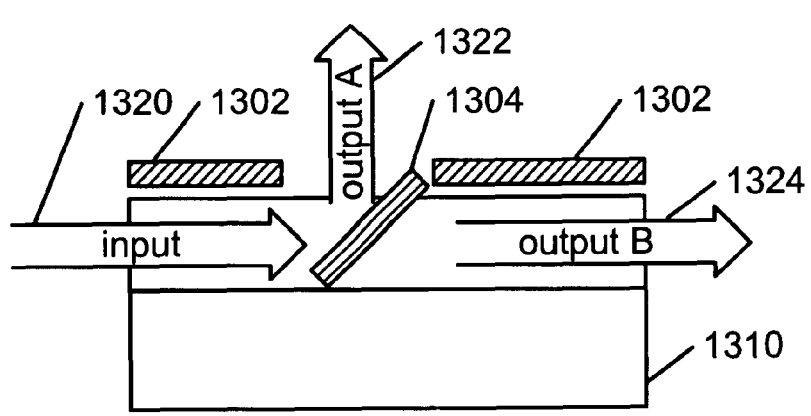
FIG. 13C shows a side view of a cutaway of an optical switch structure shown in FIG. 13B as per an embodiment of the present invention.

The top membrane 1302 of the hollow waveguide may be patterned to create a basic switch. 1310 is a bottom substrate with a hollow cavity 1312. FIG. 13A shows a cantilever beam 1304 in an undeflected position and FIG. 13C shows cantilever beam 1304 in a deflected position. FIG. 13B is a top view of the waveguide. FIG. 13C further shows an input light beam 1320 switched to output A 1322 because the cantilevered beam 1304 is a deflected down position. Input light beam 1320 would be switched to output B 1324 when the cantilevered beam 1304 is in an undeflected up position. One skilled in the art will recognize that this configuration may correspond to the most basic switch shown in FIG. 1.

Figure 2:
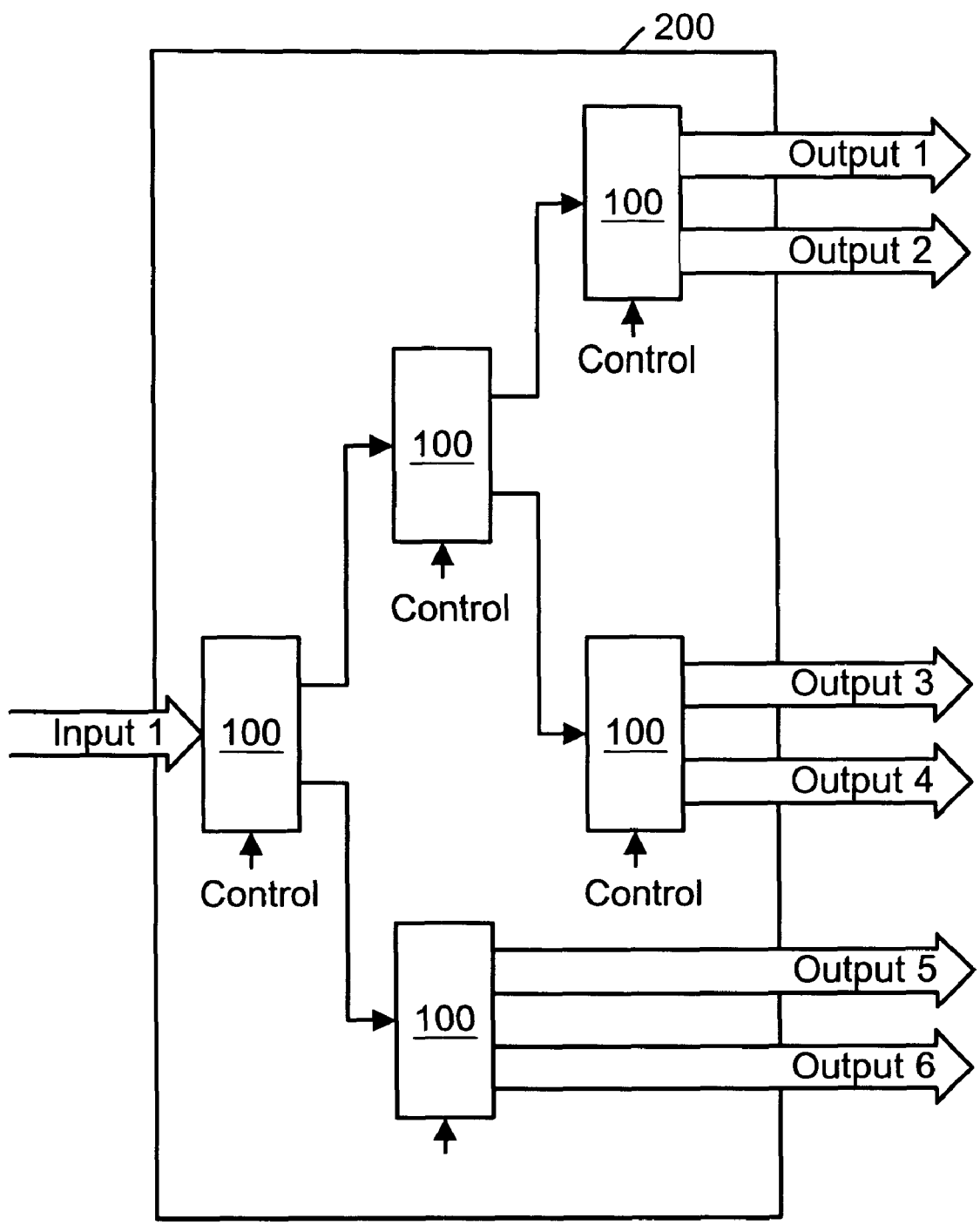
FIG. 2 (prior art) is a block diagram of a 1×N switch constructed from a multitude of 1×2 optical switches.
Figure 3:
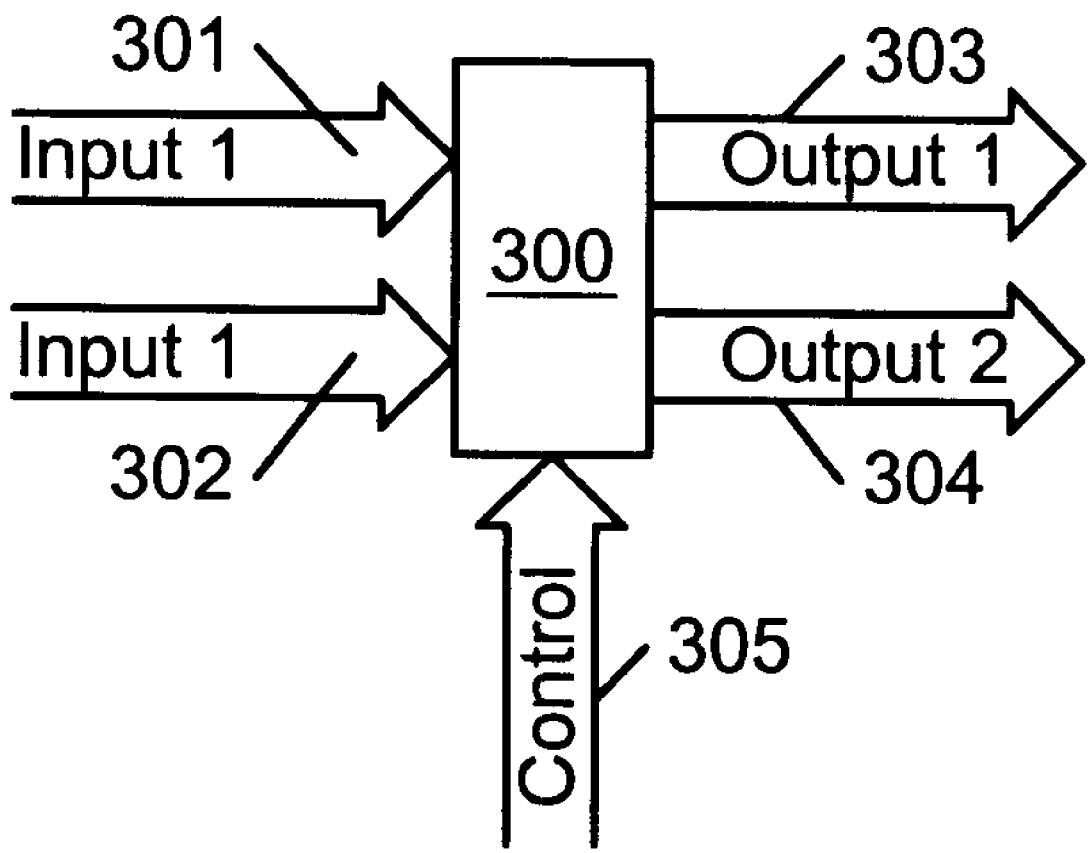
FIG. 3 (prior art) is a block diagram of a two input, two output optical switch.
Figure 4A:
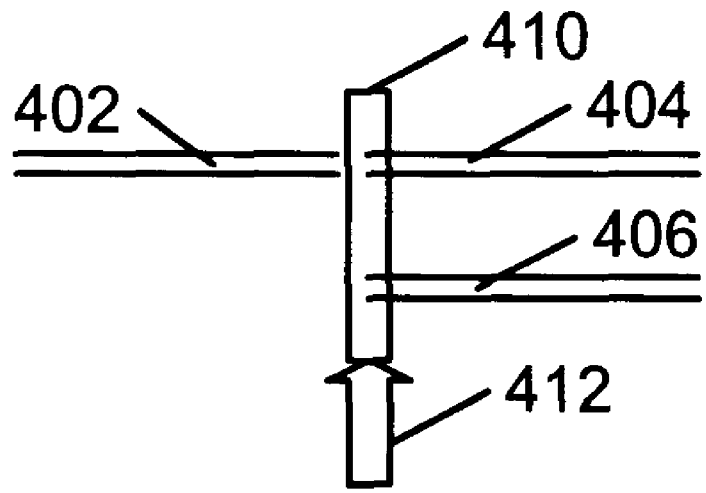
FIG. 4A (prior art) is a block diagram showing a 1×2 optical switch involving mechanical movements in a first position.
Figure 4B:
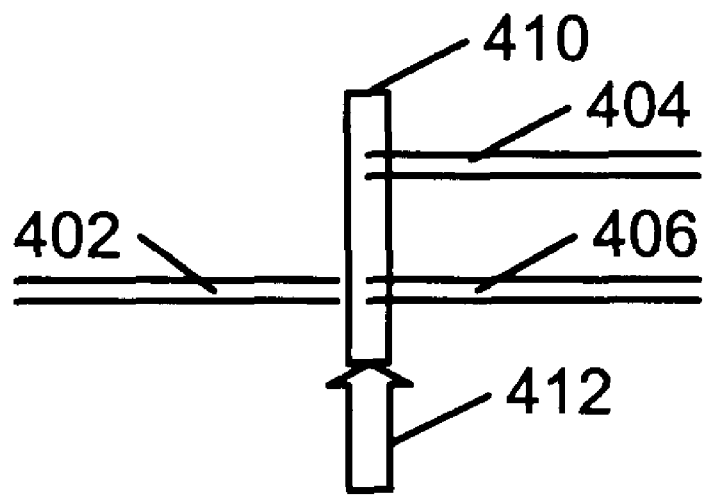
FIG. 4B (prior art) is a block diagram showing a 1×2 optical switch involving mechanical movements in a second position.
Figure 5:
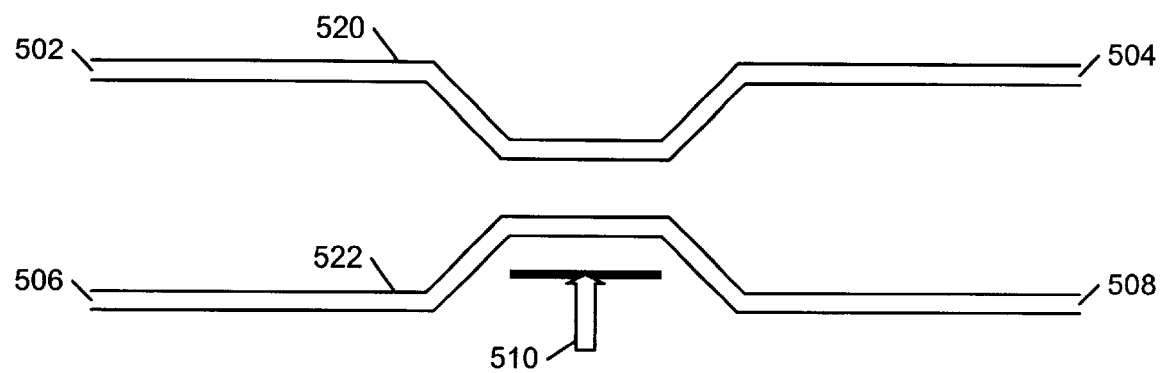
FIG. 5 (prior art) is a block diagram a 1×2 switch using a directional coupler.
Figure 6:
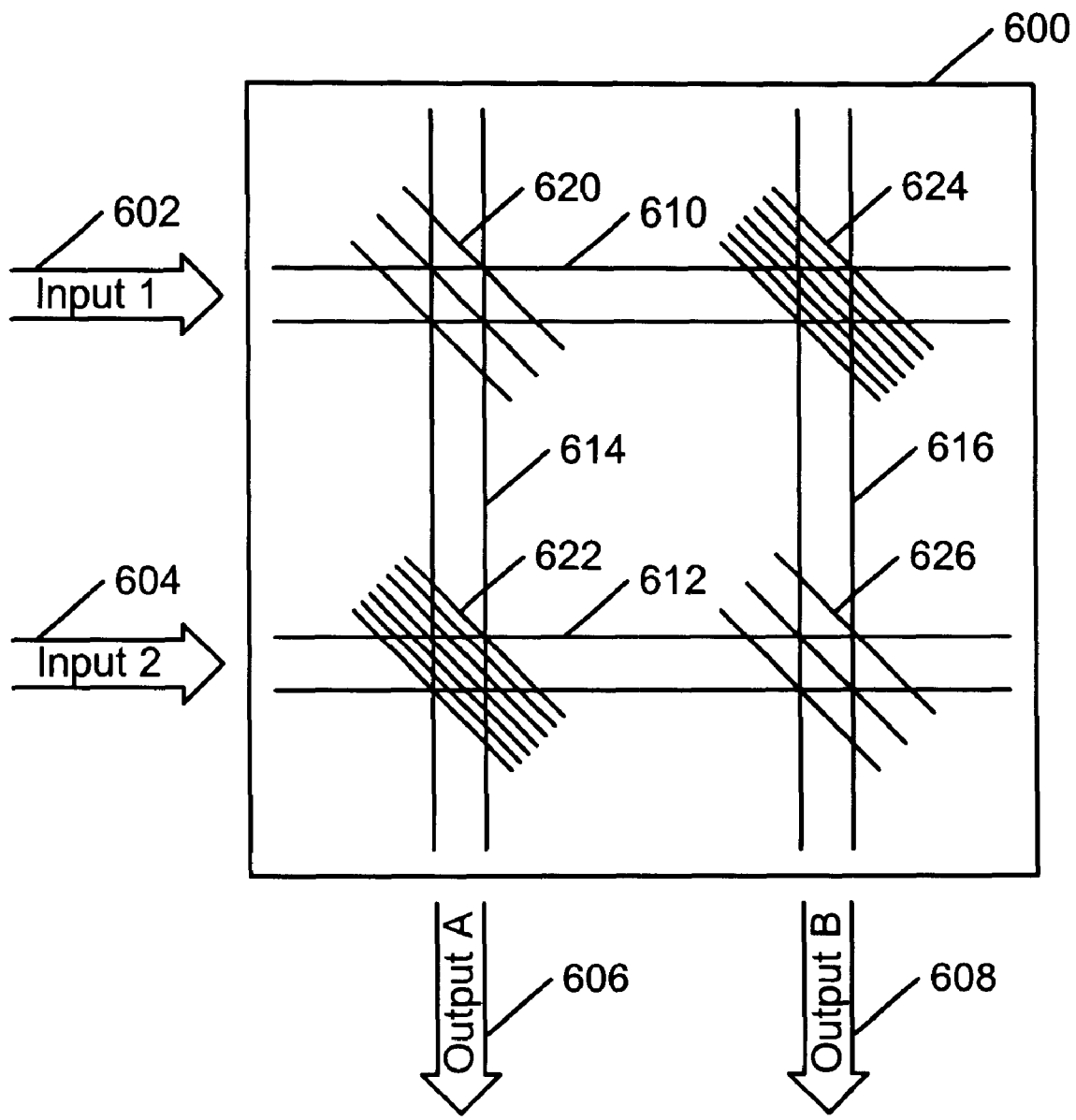
FIG. 6 (prior art) is a block diagram showing integrated optical switches utilizing electrooptically-activated Bragg reflectors embedded into waveguide junctions.
Figure 7:
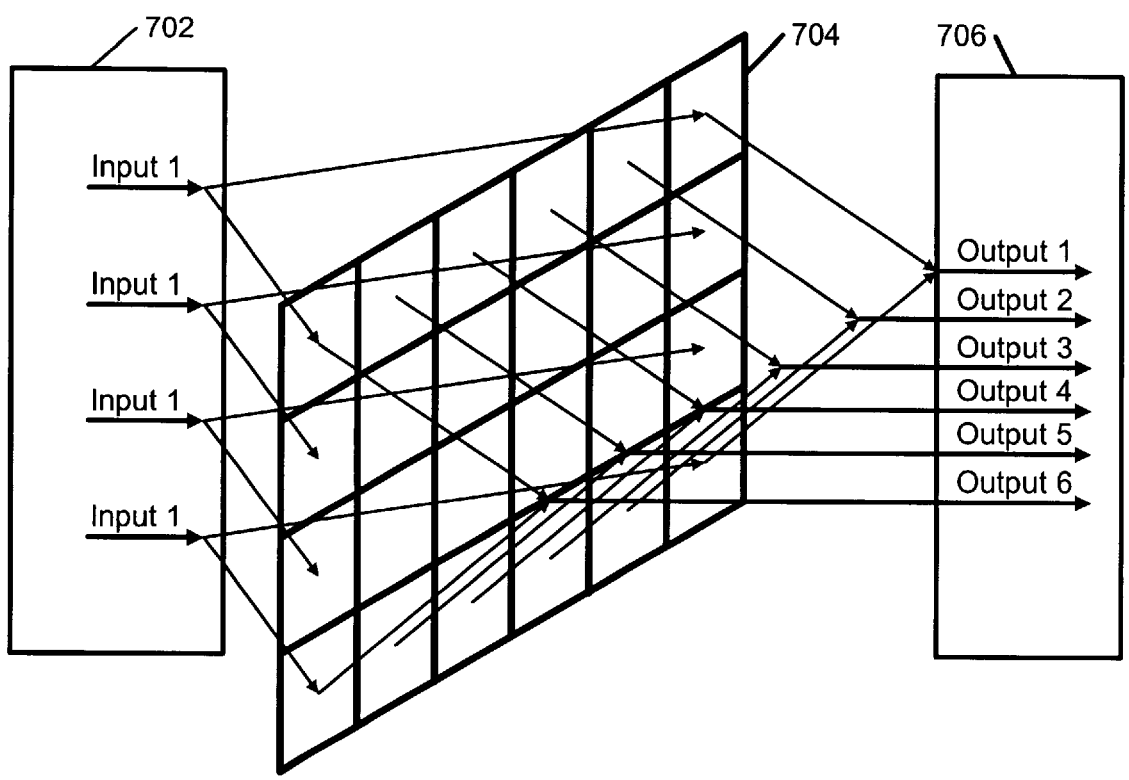
FIG. 7 (prior art) is a diagram of a free space optical switch.
Figure 8:
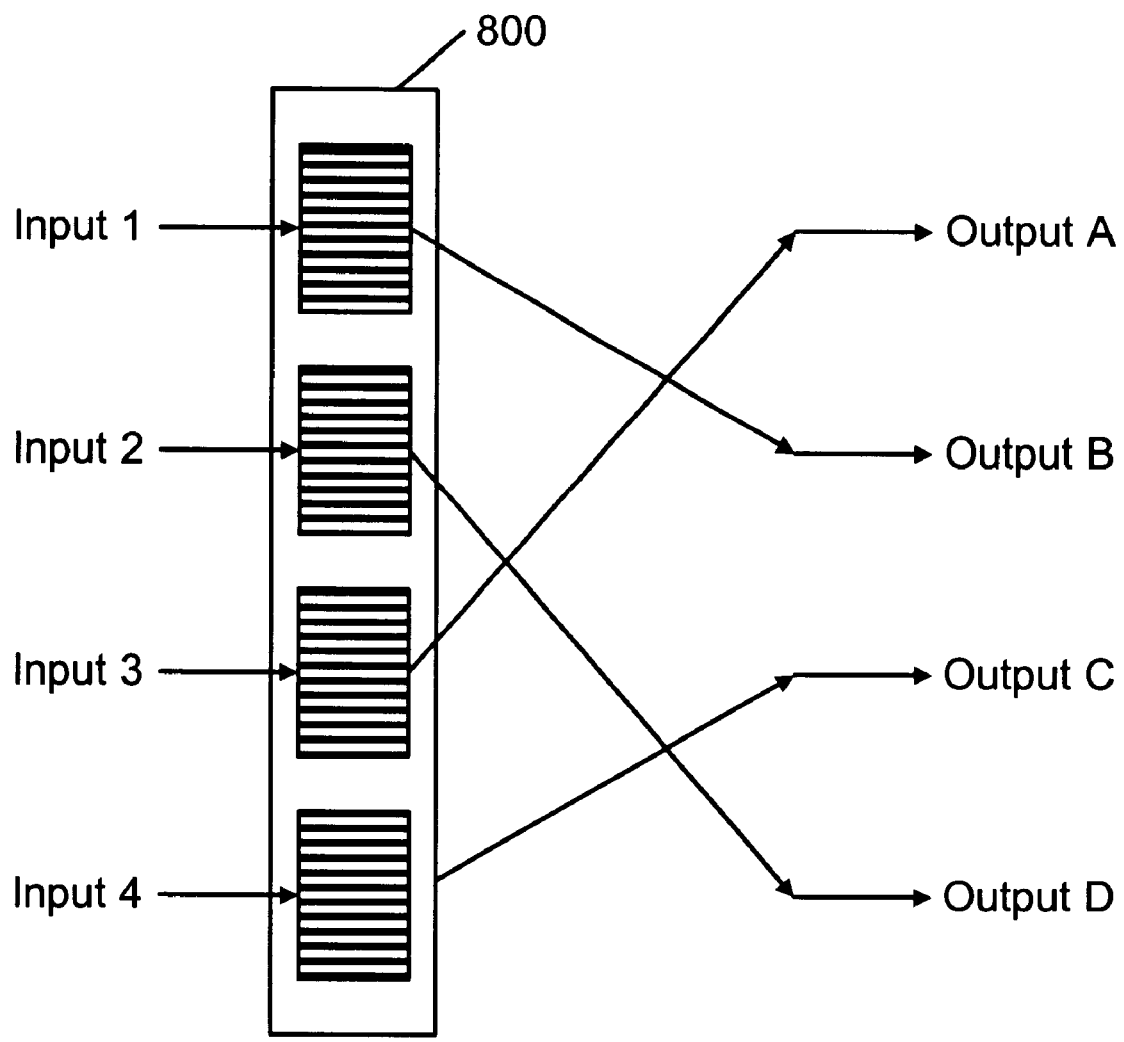
FIG. 8 (prior art) is a block diagram of a cross bar optical switch.
Figure 9:
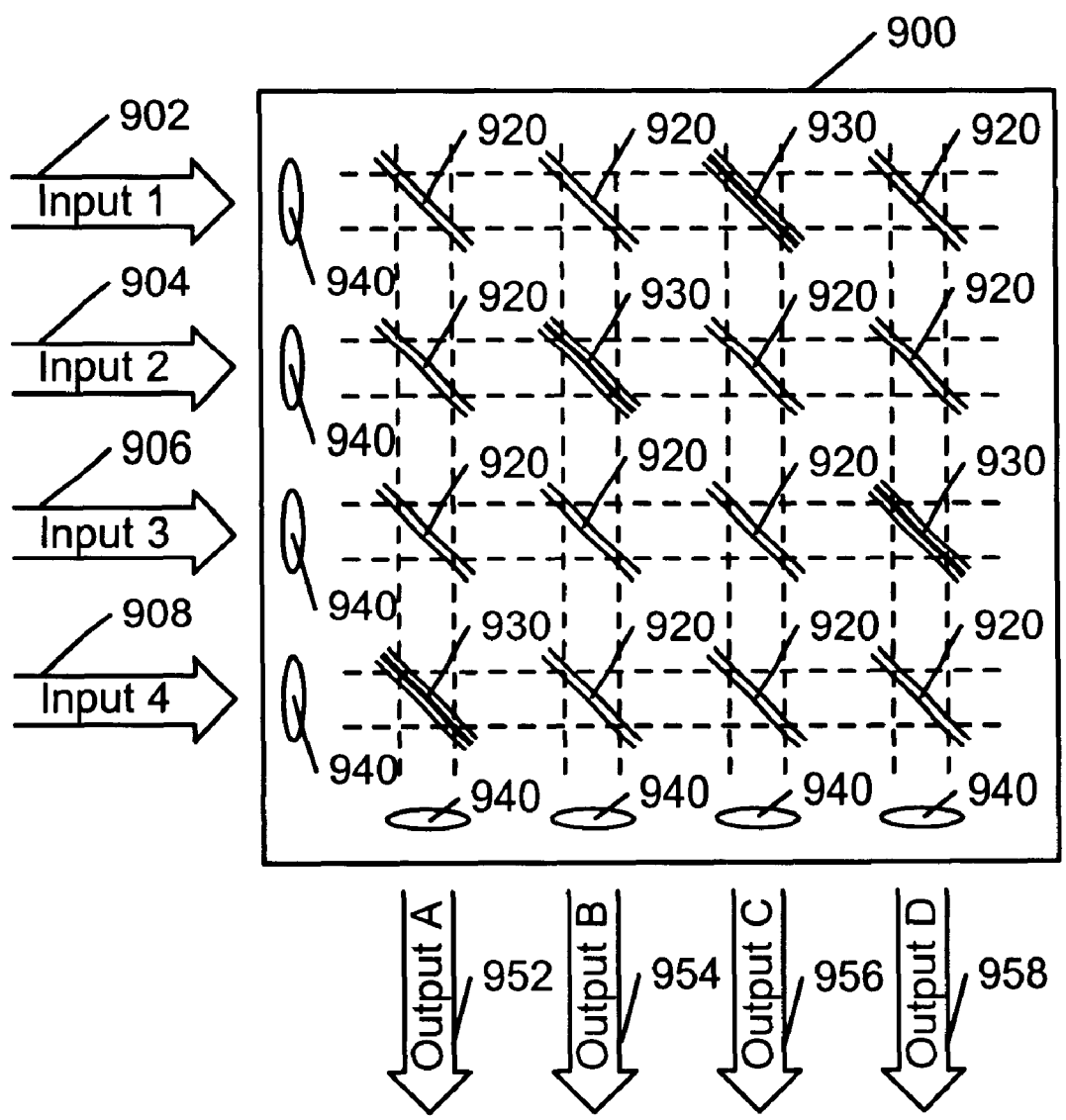
FIG. 9 (prior art) is a block diagram of a free space optical cross bar switch.
Figure 14A:
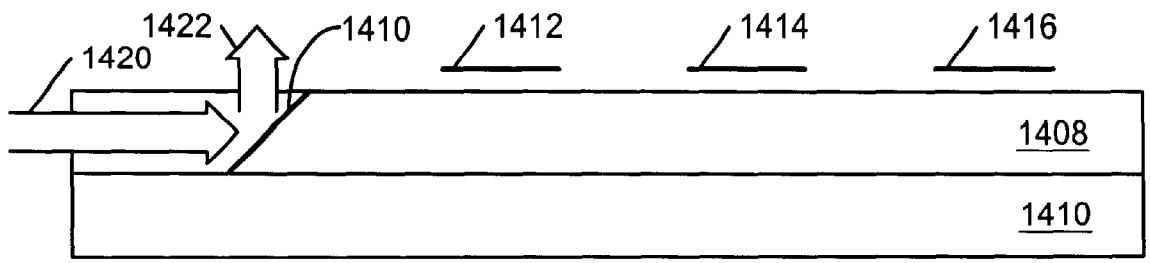
FIG. 14A shows a side view of a cutaway of an optical switch structure with a first deflectable mirror in an activated position as per an embodiment of the present invention.
Figure 14B:
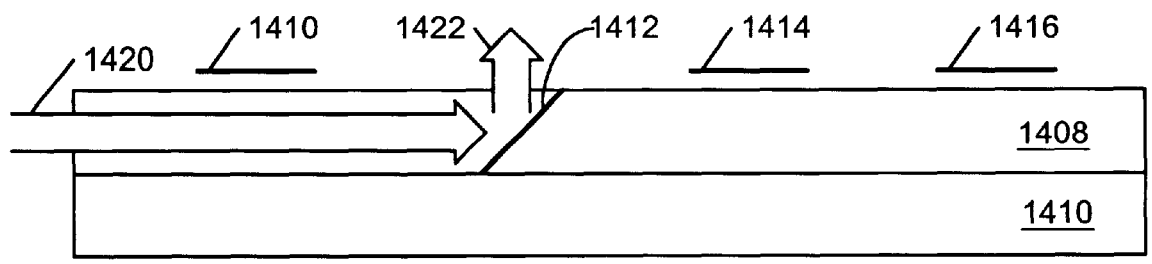
FIG. 14B shows a side view of a cutaway of an optical switch structure with a second deflectable mirror in an activated position as per an embodiment of the present invention.
Figure 14C:
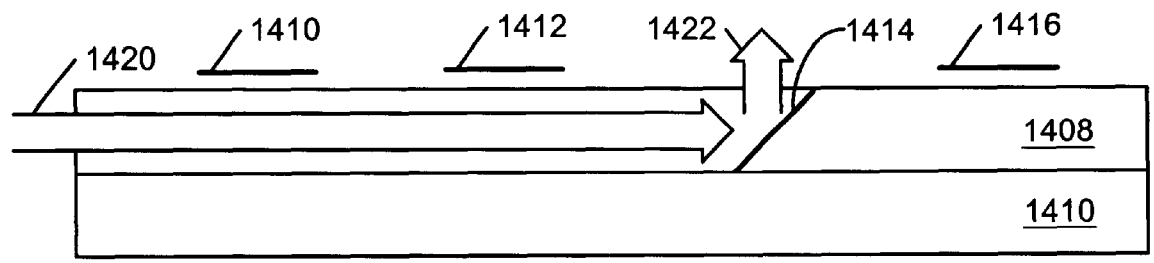
FIG. 14C shows a side view of a cutaway of an optical switch structure with a third deflectable mirror in an activated position as per an embodiment of the present invention.
Figure 14D:
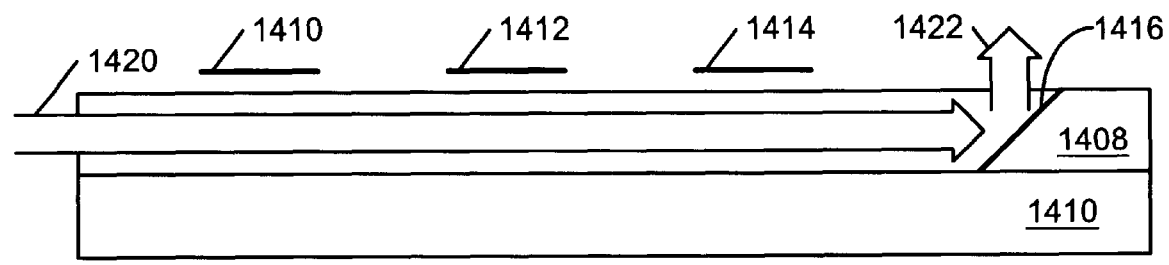
FIG. 14D shows a side view of a cutaway of an optical switch structure with a fourth deflectable mirror in an activated position as per an embodiment of the present invention.

FIGS. 14A, 14B, 14C, and 14D show this concept extended to include several such cantilevered beams along a hollow waveguide in a side view of such a structure with four cantilevered beam deflectors. The structure has a first cantilever beam 1410, a second cantilever beam 1412, a third cantilever beam 1414, and fourth cantilever beam 1416 residing atop a hollow channel 1408 in a substrate 1410. A light beam 1420 propagates down the hollow channel 1408 in each figure. When the light beam 1420 encounters a deflected cantilever beam, light beam 1420 is reflected out of the optical switch structure as a reflected light beam 1422. Any one of the cantilever beams (1410, 1412, 1414, or 1416) can therefore switch light propagating along the hollow waveguide 1408 out when that beam is deflected down. FIG. 14A shows a first cantilever beam 1410 in a deflected position, with all of the other cantilever beams in a non deflecting position, deflecting light beam 1420 out of the optical switch structure. FIG. 14B shows a second cantilever beam 1412 in a deflected position, with all of the other cantilever beams in a non deflecting position, deflecting light beam 1420 out of the optical switch structure. FIG. 14C shows a third cantilever beam 1414 in a deflected position, with all of the other cantilever beams in a non deflecting position, deflecting light beam 1420 out of the optical switch structure. FIG. 14D shows a fourth cantilever beam 1416 in a deflected position, with all of the other cantilever beams in a non deflecting position, deflecting light beam 1420 out of the optical switch structure. One skilled in the art will recognize that this configuration may correspond to the a 1×M switch as shown in FIG. 2.

Figure 15A:
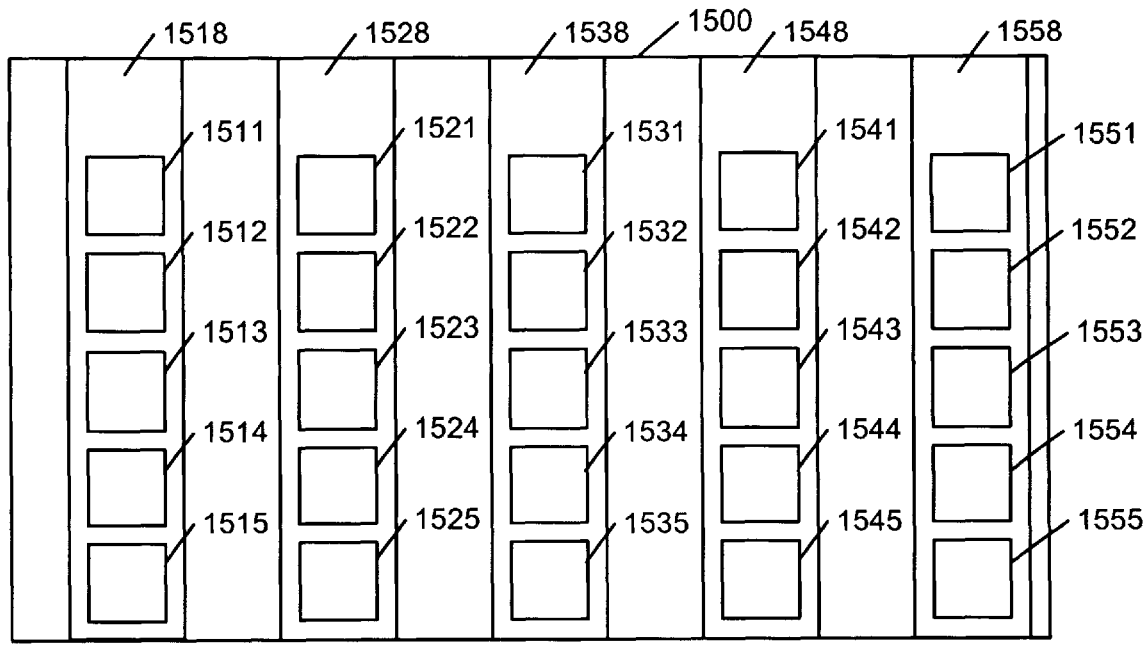
FIG. 15A is a top view of an N×M optical switch as per an embodiment of the present invention with all cantilever beams in their undeflected positions.

FIG. 15A is a top view of an N×M optical switch as per an embodiment of the present invention with all cantilever beams in their undeflected positions. N hollow waveguides are integrated onto a single substrate, wherein each hollow waveguide contains M cantilevered beam deflector switches arranged along them. There are N×M windows for the light to emerge from the hollow waveguide substrate perpendicular to the substrate. In the present illustration N=5 and M=5. The first hollow waveguide 1518 includes cantilever beams 1511, 1512, 1513, 1514, and 1515. The second hollow waveguide 1528 includes cantilever beams 1521, 1522, 1523, 1524, and 1525. The third hollow waveguide 1538 includes cantilever beams 1531, 1532, 1533, 1534, and 1535. The fourth hollow waveguide 1548 includes cantilever beams 1541, 1542, 1543, 1544, and 1545. The fifth hollow waveguide 1558 includes cantilever beams 1551, 1552, 1553, 1554, and 1555.

Figure 15B:
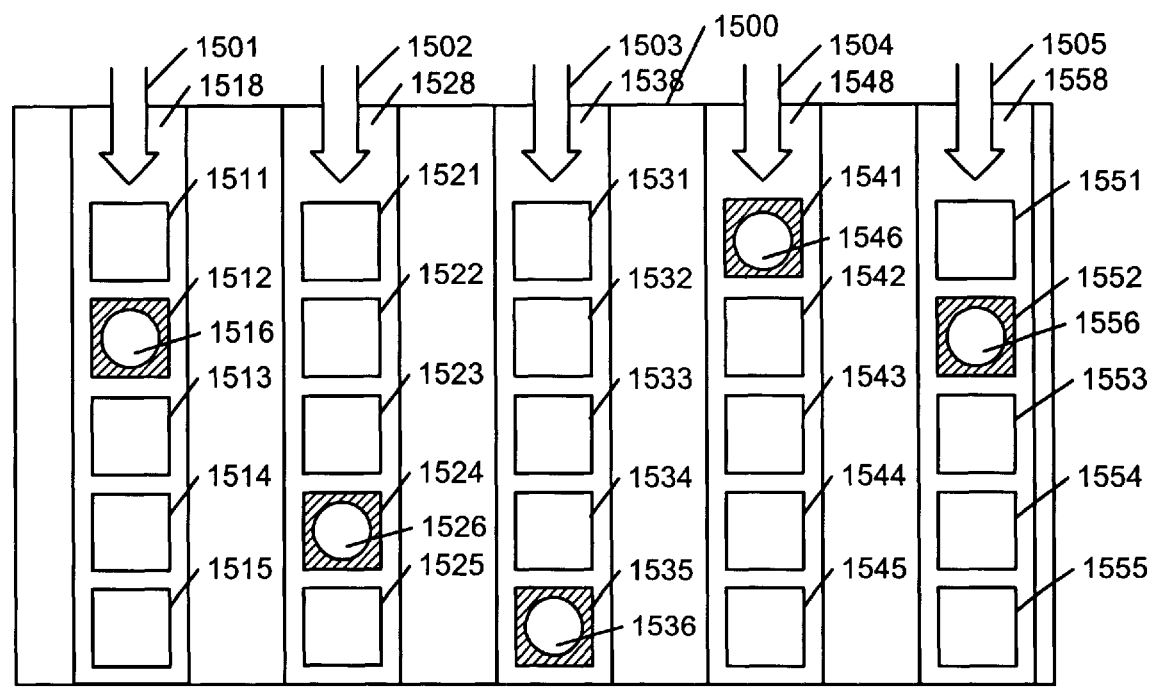
FIG. 15B is a top view of an N×M optical switch as per an embodiment of the present invention with some of the cantilever beams in a deflected position, reflecting light beams out of the optical switch structure.

FIG. 15B is a top view of an N×M optical switch as per an embodiment of the present invention with some of the cantilever beams in a deflected position, reflecting light beams out of the optical switch structure. As illustrated, light beam 1501 is reflected out of the switch structure by deflected cantilever beam 1512 as reflected light beam 1516, light beam 1502 is reflected out of the switch structure by deflected cantilever beam 1524 as reflected light beam 1526, light beam 1503 is reflected out of the switch structure by deflected cantilever beam 1535 as reflected light beam 1536, light beam 1504 is reflected out of the switch structure by deflected cantilever beam 1541 as reflected light beam 1546, and light beam 1505 is reflected out of the switch structure by deflected cantilever beam 1552 as reflected light beam 1556.

Periscope Switch Architecture

Figure 16A:
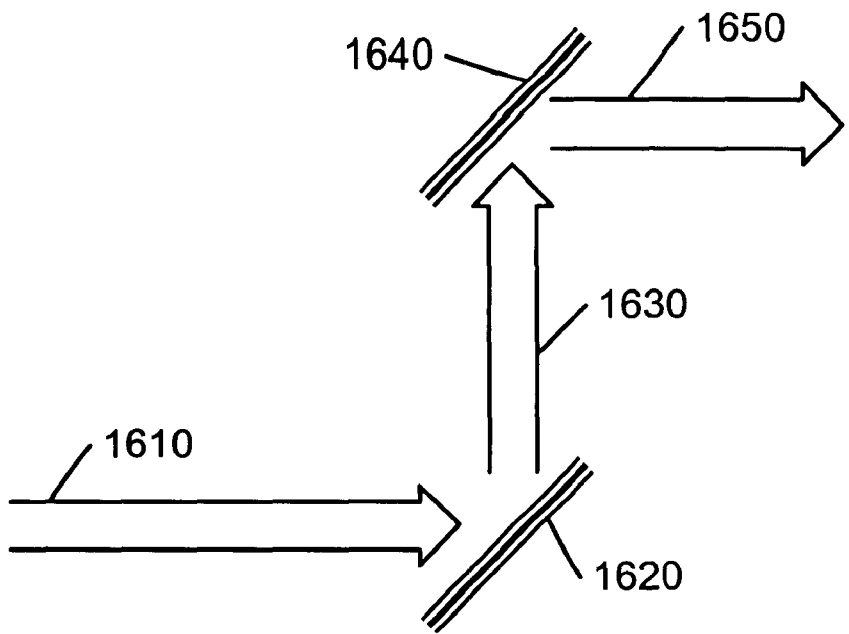
FIGS. 16A & 16B illustrates periscope beam reflection as per an embodiment of the present invention.
Figure 16B:
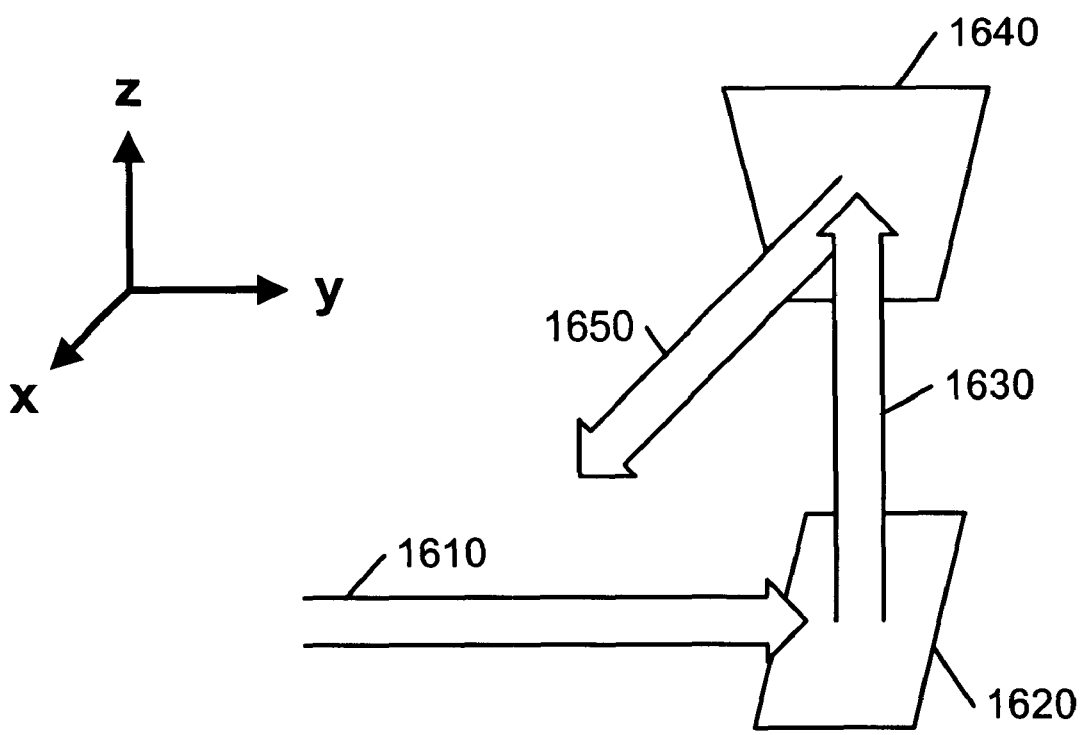

A deflector switch that redirects light perpendicular to the plane of propagation may now be combined with another deflector switch that redirects light perpendicular to the plane of propagation in a manner similar to a periscope. FIG. 16A illustrates periscope beam reflection as per an embodiment of the present invention. In a standard periscope, a second mirror 1640 is parallel to a first mirror 1620. An input light beam 1610 is reflected on a first mirror 1620 creating a reflected light beam 1630. The reflected beam light beam 1630 is then reflected on a second mirror 1640 creating an output light beam 1640. The output light beam 1650 continues parallel to the input light beam 1610 with a vertical displacement. FIG. 16B illustrates a second periscope beam reflection as per an embodiment of the present invention where an output light beam 1640 travels perpendicular to the input light beam 1610 except in a different vertically displaced plane.

Figure 17:
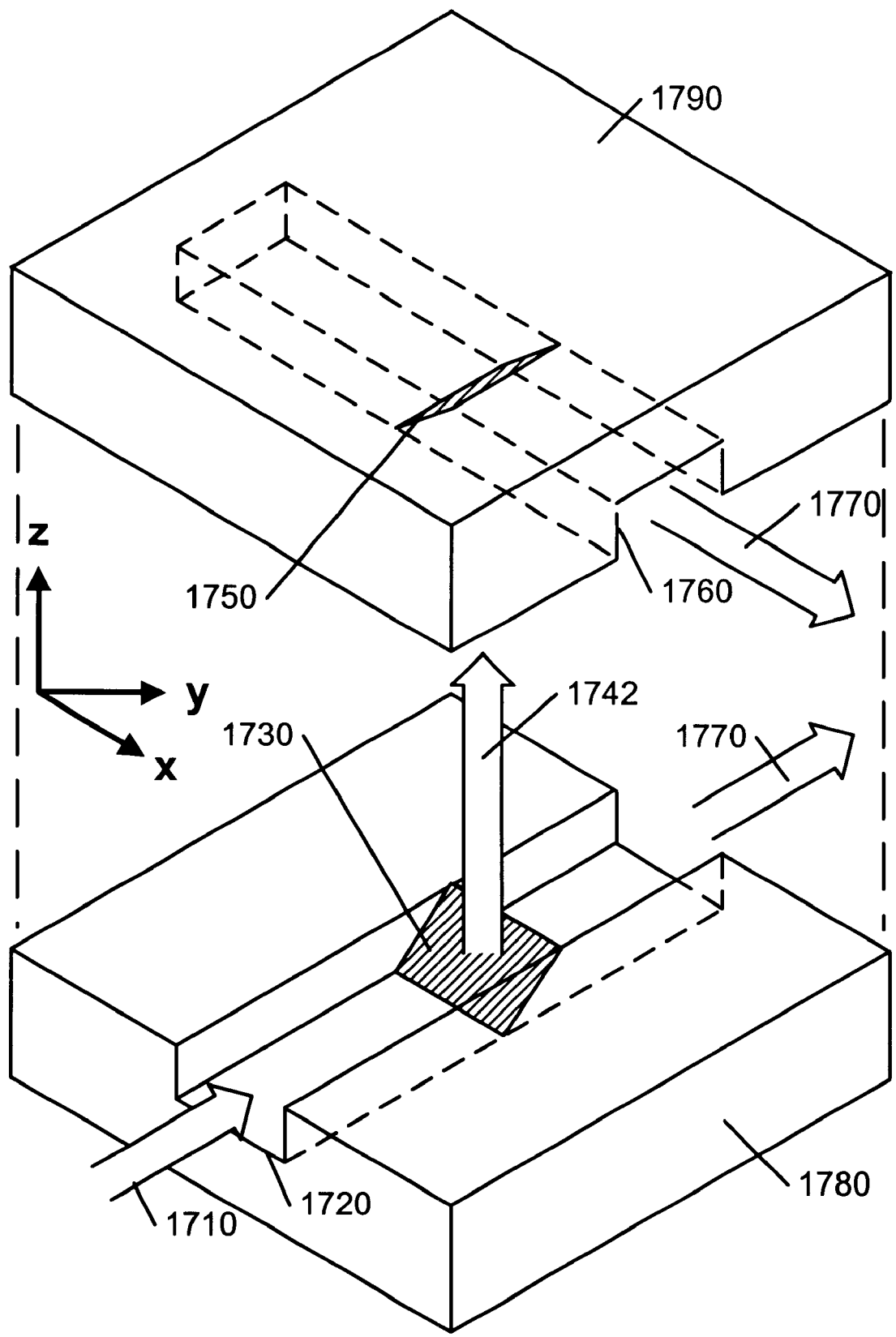
FIG. 17 is a 3-D diagram of two hollow waveguides stacked on top of each other and oriented perpendicular to each other as per an embodiment of the present invention.

The device shown in FIG. 15 is capable of deflecting a light beam propagating in a hollow waveguide out of the plane of the hollow waveguide and vice versa. FIG. 17 further shows a cross connect switch generated by combining two optical switches capable of deflecting a light beam propagating in a hollow waveguide out of the plane of the waveguide and vice versa. The first optical switch 1780 is capable of reflecting a light beam 1710 propagating in a hollow waveguide 1720 out of the plane of the first optical switch. The second optical switch 1790 is capable of receiving an incident beam 1742 and coupling it into the hollow waveguide 1760 of the second switch. As illustrated, the first optical switch may be oriented orthogonal to the second optical switch. This creates an optical switch where the hollow waveguides in the switches are oriented perpendicular to each other.

This principle is explained in FIG. 17, which depicts a 3-D schematic of two hollow waveguides stacked on top of each other and oriented perpendicular to each other. An input light beam 1710 traveling in a first hollow waveguide 1720 oriented along a y-axis may be switched out of the plane by a first cantilevered beam deflector 1730 in a first waveguide 1720. A reflected light beam 1740 now travels along a z-axis when it encounters a second cantilevered beam deflector 1750 in a second hollow waveguide 1760 oriented along an x-axis. The reflected light beam 1740 is reflected by the second cantilevered beam deflector 1750 and subsequently output as a second output light beam 1770 through the second hollow waveguide 1760 oriented along the x-axis. The input light beam 1710 therefore undergoes a 90-degree beam deflection and a displacement along the Z-axis. If neither of the cantilevered beam deflectors are activated, the input light beam 1710 will continue along the first hollow waveguide 1720 oriented in the x direction and emerge from the other end of the first hollow waveguide 1720 as a first output beam 1780. This construction creates a quasi-planar version of the 1×2 switch.

Figure 18:
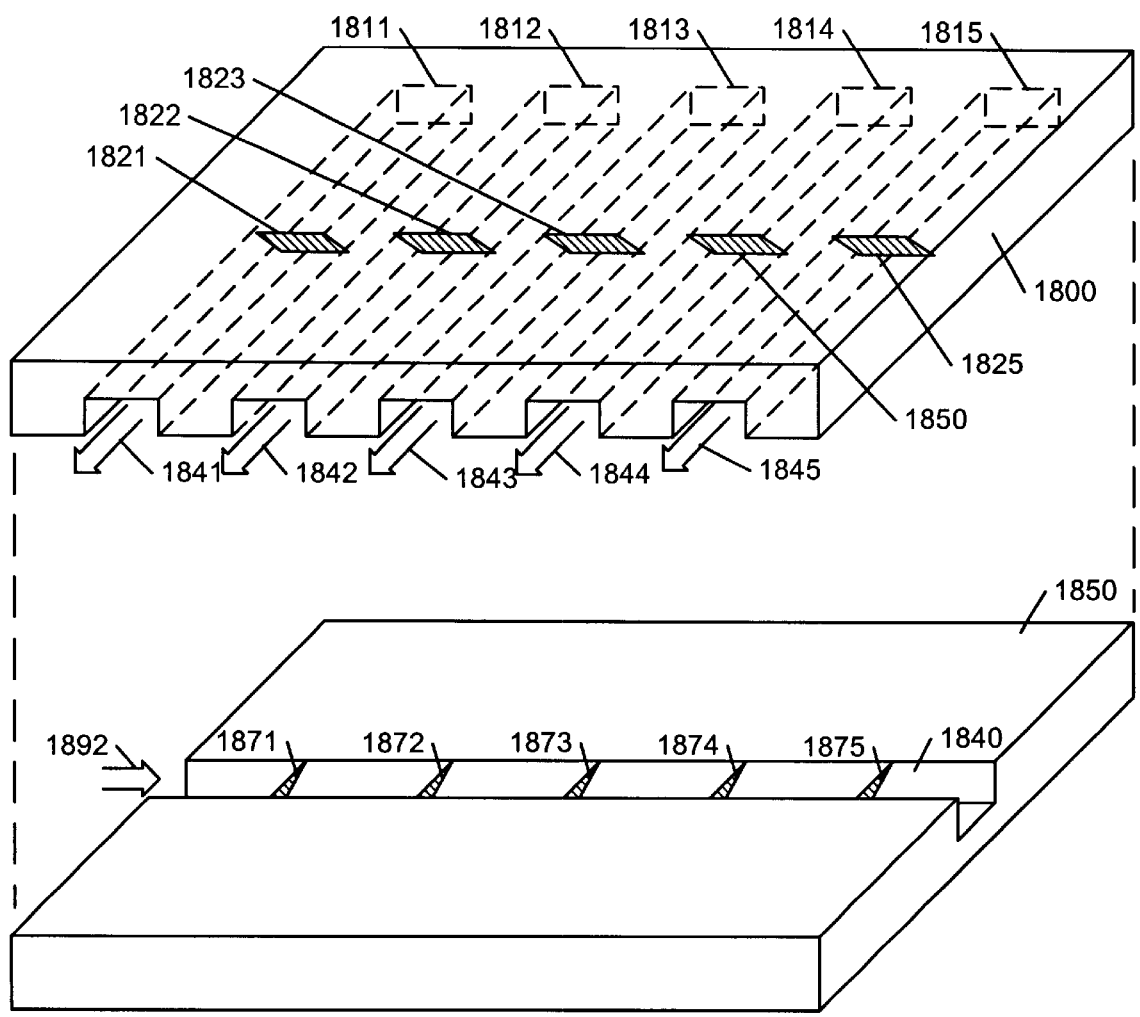
FIG. 18 is a diagram of a 1×M optical switch as per an embodiment of the present invention.

FIG. 18 depicts a 1×M optical switch as per an embodiment of the present invention, where M=5. This switch has multiple y-axis waveguides (1811, 1812, 1813, 1814, and 1815), along a y-axis which cross a single x-axis waveguide 1840 along an x-axis in a separate plane. The single x-axis waveguide 1840 may have M deflector switches (1871, 1872, 1873, 1874, and 1875) positioned where the x-axis waveguide 1840 crosses another waveguide along the y-axis. Input signal 1892 is directed to one of M output channels by activating the appropriate pair of cantilevered beam deflectors (1871 & 1821, 1872 & 1822, 1873 & 1823, 1874 & 1824, or 1875 & 1825) in the X and Y waveguides. A single output light beam, either 1841, 1842, 1843, 1844, or 1845 may be output depending upon which set of cantilever mirrors are deflected.

The 1×M switch may be generalized to an N×M cross-connect switch by providing N waveguides that are oriented along the X-axis. There are NM intersection points. At each point a cantilevered beam deflector may be provided in the two sets of waveguides oriented along x-axis and y-axis thus requiring a total of 2NM cantilevered beam deflectors. If a light beam propagating in the $i^{th}$ input waveguide is to be switched to the $j^{th}$ output waveguide, then the two deflector switches that are at the intersection of the $i^{th}$ input waveguide and $j^{th}$ output waveguide may be activated. It should be noted that only one deflector switch may be activated along a single waveguide. Therefore such a cross-connect may implement an arbitrary permutation of N input channels to M output channels.

Figure 19:
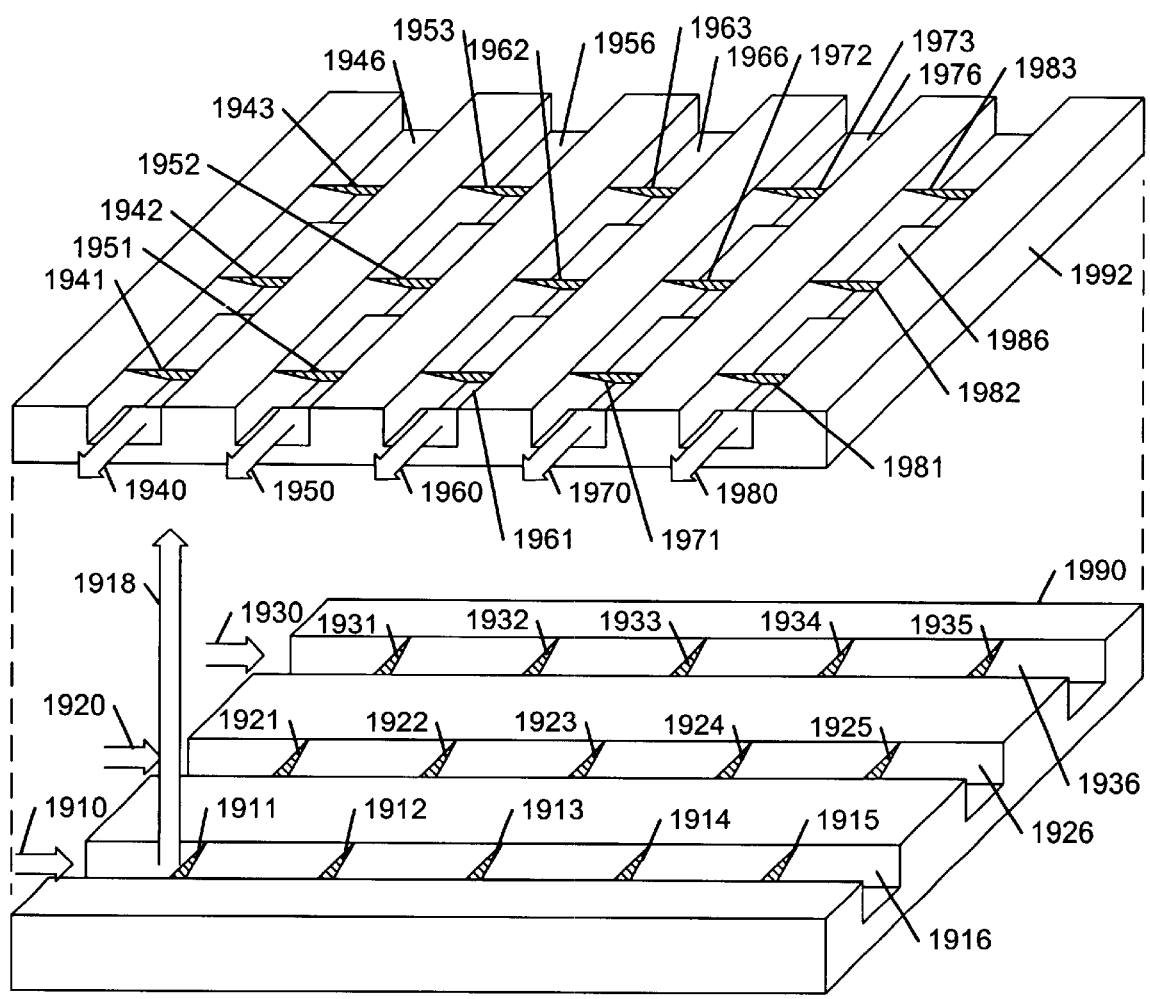
FIG. 19 is a diagram of an N×M cross connect optical switch as per an embodiment of the present invention.

FIG. 19 illustrates an N×M cross connect optical switch constructed out of a first optical switch 1990, a second optical switch 1992, and an additional plate (not shown) atop optical switch 1992 where N equals 3 and M equals 5. The additional plate may serve the function of preventing light leakage from the cross connect optical switch. Input light beam 1910 preferably propagates down x-axis waveguide 1916 where input light beam 1910 may be reflected by one of the x-axis cantilever beam deflectors (1911, 1912, 1913, 1914, or 1915) to a corresponding y-axis cantilever beam deflector. Input light beam 1920 preferably propagates down x-axis waveguide 1926 where input light beam 1920 may be reflected by one of the x-axis cantilever beam deflectors (1921, 1922, 1923, 1924, or 1925) to a corresponding y-axis cantilever beam deflector. Input light beam 1930 preferably propagates down x-axis waveguide 1936 where input light beam 1930 may be reflected by one of the x-axis cantilever beam deflectors (1931, 1932, 1933, 1934, or 1935) to a corresponding y-axis cantilever beam deflector.

Output light beam 1940 preferably propagates down y-axis waveguide 1946 after being reflected by one of the y-axis cantilever beam deflectors (1941, 1942, or 1943) from a corresponding x-axis cantilever beam deflector. Output light beam 1950 preferably propagates down y-axis waveguide 1956 after being reflected by one of the y-axis cantilever beam deflectors (1951, 1952, or 1953) from a corresponding x-axis cantilever beam deflector. Output light beam 1960 preferably propagates down y-axis waveguide 1966 after being reflected by one of the y-axis cantilever beam deflectors (1961, 1962, or 1963) from a corresponding x-axis cantilever beam deflector. Output light beam 1970 preferably propagates down y-axis waveguide 1976 after being reflected by one of the y-axis cantilever beam deflectors (1971, 1972, or 1973) from a corresponding x-axis cantilever beam deflector. Output light beam 1980 preferably propagates down y-axis waveguide 1986 after being reflected by one of the y-axis cantilever beam deflectors (1981, 1982, or 1983) from a corresponding x-axis cantilever beam deflector.

As a specific example, we see in FIG. 19 input light beam 1910 propagating down x-axis waveguide 1916 where input light beam 1910 is reflected by x-axis cantilever beam deflectors 1911 to corresponding y-axis cantilever beam deflector 1941 in y-axis waveguide 1941 as reflected light beam 1919. Reflected light beam 1919 is reflected by y-axis cantilever beam deflector 1941 down y-axis waveguide 1941 as output light beam 1940.

Figure 20:
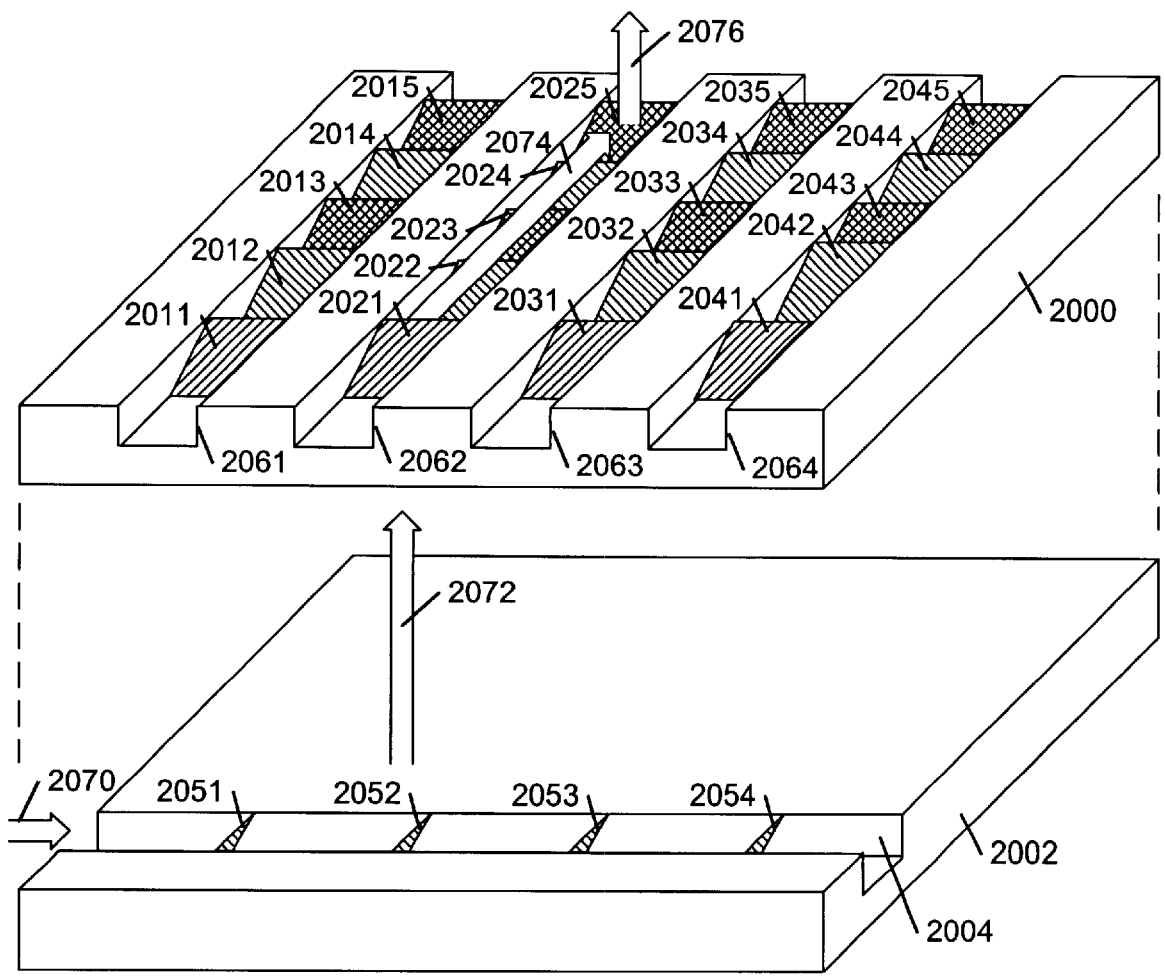
FIG. 20 is a diagram of an optical scanner as per an embodiment of the present invention.

An optical system of the present invention may also be an optical scanner, viewer, or the like. FIG. 20 shows an optical scanner as per an embodiment of the present invention. A bottom substrate 2002 may contain a single hollow bottom substrate waveguide 2004 with 4 cantilevered beam deflectors 2051, 2052, 2053, and 2054 arranged along its length. A top substrate 2000 may contain 4 hollow top substrate waveguides 2061, 2062, 2063, and 2064 oriented orthogonally to the single hollow bottom substrate waveguide 2004 in the bottom substrate 2002. These 4 hollow top substrate waveguides 2061, 2062, 2063, and 2064 may each contain a corresponding cantilevered beam 2011, 2021, 2031, and 2041 respectively, at the intersection with the single hollow bottom substrate waveguide 2004. The 4 hollow top substrate waveguides 2061, 2062, 2063, and 2064 also contain N cantilevered beam deflectors each at regularly spaced intervals along its length. Hollow top substrate waveguides 2061 contains cantilevered beam deflectors 2012, 2013, 2014, and 2015, each at regularly spaced intervals along its length. Hollow top substrate waveguides 2062 contains cantilevered beam deflectors 2022, 2023, 2024, and 2025, each at regularly spaced intervals along its length. Hollow top substrate waveguides 2063 contains cantilevered beam deflectors 2032, 2033, 2034, and 2035, each at regularly spaced intervals along its length. Hollow top substrate waveguides 2064 contains cantilevered beam deflectors 2042, 2043, 2044, and 2045, each at regularly spaced intervals along its length. These deflectors may couple light out of the waveguides normal to the surface.

A time-modulated optical beam 2070 containing image information may be coupled into the single hollow bottom substrate waveguide 2004. This time-modulated optical beam 2060 may then be sequentially switched into a first reflected optical beam 2072 to one of the waveguides in the top substrate 2000. This first reflected optical beam 2072 may be reflected down the waveguide by one of the first cantilevered beam deflectors 2012, 2013, 2014, or 2015 in the top substrate waveguide as a second reflected optical beam 2074. From each waveguide, the light is preferably switched out sequentially normal to the plane as an output reflected optical beam 2076. Thus, the input image may be scanned along the 4×4 locations in the top substrate where 5 cantilevered beams are present along each of the 4-waveguides. In practice, the switch illustrated in FIG. 20 might have an additional plate (not shown) atop substrate 2000 to prevent light leakage. One skilled in the art will recognize that this embodiment may be easily adapted to a generic N×M optical scanner or display, where N and M may be any reasonable number, for example 640×1024 or the like.

The substrate may also contain other microelectronics such as control circuitry for controlling the optical switch. It is also possible for the optical switch to be fabricated using Micro lithography techniques.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may used to create optical switches of varying sizes and configurations. For example, although combined optical switch combinations have been described as being orthogonal, one skilled in the art will recognize that other angular combinations may be used. Similarly, active positions of the cantilever beam may be at positions other than forty-five or zero degrees.

What is claimed is:

1. An optical switch comprising:
   a. a plurality of optical wave.guide switches, each of said plurality of optical waveguide switches comprising:
      i. an optical waveguide including:
         1. a substrate having a hollow channel running through said substrate, said hollow channel having a beginning and an end;
         2. a plate residing atop said hollow channel;
         3. an input aperture at said beginning of said hollow channel; and
         4. an output aperture at said end of said hollow channel;
      ii. a plurality of micro-mechanical deflectable cantilevered beam mirrors formed in said plate oriented along said optical waveguide, said micro-mechanical deflectable cantilevered beam mirrors having:
         1. a deflected position where said micro-mechanical deflectable cantilevered beam mirrors are operably deflected out of the plane of said plate into said hollow channel for intercepting an optical signal and deflecting said optical signal out of the plane of said hollow waveguide; and
         2. a non-deflected position where said micro-mechanical deflectable cantilevered beam mirrors remain in the plane of said plate;
      iii. a plurality of mirror apertures, each of said plurality of mirror apertures operably formed when each of said micro-mechanical deflectable cantilevered beam mirrors are in their deflected position;
   b. at least two layers, each of said layers comprising at least one of said optical waveguide switches;
   c. an optical waveguide switch stack comprising at least two of said layers stacked so that at least one of said plurality of mirror apertures from each of said optical waveguide switches on adjacent said layers are aligned;
   d. at least one input optical interface, each of said input optical interfaces attached to one of said input apertures for receiving an optical signal from at least one external source; and
   e. at least one output optical interface, each of said output optical interfaces attached to one of said output apertures for said optical signal to pass from said optical switch to at least one external receiver.

2. An optical switch according to claim 1 wherein said optical waveguide has a highly reflective coating covering said hollow channel.

3. An optical switch according to claim 1 wherein said plate has a highly reflective coating in areas covering said hollow channel.

4. An optical switch according to claim 1 wherein said input optical interface and said output optical interface includes a means for connecting an optical fiber to said optical switch.

5. An optical switch as per claim 1 wherein said plate is a membrane.

6. An optical switch as per claim 1 wherein when said micro-mechanical deflectable cantilevered beam mirrors are in said non-deflected position, said micro-mechanical deflectable cantilevered beam mirrors provide a portion of said plate covering said optical waveguide for ensuring the confinement of said optical signal inside said optical waveguide.

7. An optical switch as per claim 1 wherein the central region of said optical waveguide has a higher refractive index than the surrounding region of said optical waveguide.

8. An optical switch as per claim 1 wherein the guiding region of said optical waveguide contains a gas.

9. An optical switch as per claim 8 where said gas is air.

10. An optical switch as per claim 1 wherein said substrate has a characteristic selected from the group consisting of:
    a. transparent; and
    b. opaque.

11. An optical switch as per claim 1 wherein said substrate has a characteristic selected from the group consisting of:
    a. metallic; and
    b. insulating.

12. An optical switch as per claim 1 wherein said substrate has a structure selected from the group consisting of:
    a. a crystal structure; and
    b. an amorphous structure.

13. An optical switch as per claim 1 wherein said plate has a characteristic selected from the group consisting of:
    a. transparent; and
    b. opaque.

14. An optical switch as per claim 1 wherein said plate has a characteristic selected from the group consisting of:
    a. metallic; and
    b. insulating.

15. An optical switch as per claim 1 wherein said plate has a structure selected from the group consisting of:
    a. a crystal structure; and
    b. an amorphous structure.

16. An optical switch as per claim 1 wherein when said micro-mechanical deflectable cantilevered beam mirrors are in said deflected position, the deflection angle is 45 degrees.

17. An optical switch as per claim 1 wherein said substrate is a hollow cavity.

18. An optical switch as per claim 1, wherein said optical switch is a cross connect optical switch where:
    a. one of said layers is a first layer;
    b. said at least one of one of said optical waveguide switches on said first layer is a multitude of said optical waveguide switches aligned in parallel;
    c. one of said layers is a second layer
    d. said at least one of one of said optical waveguide switches on said second layer is a multitude of said optical waveguide switches aligned in parallel;
    e. said first layer and said second layer are adjacent layers; and
    f. said first layer and said second layer are aligned so that said optical waveguide switches on said first layer are perpendicular to said optical waveguide switches on said second layer.

19. An optical switch as per claim 1, wherein said optical switch is a 1×M optical switch:
    a. one of said layers is a first layer;
    b. said at least one of one of said optical waveguide switches on said first layer is a single said optical waveguide switche;
    c. one of said layers is a second layer
    d. said at least one of one of said optical waveguide switches on said second layer has M number of said optical waveguide switches aligned in parallel;
    e. said first layer and said second layer are adjacent layers; and
    f. said first layer and said second layer are aligned so that said optical waveguide switch on said first layer is perpendicular to said optical waveguide switches on said second layer.

20. An optical switch as per claim 1, wherein said at least one of one of said optical waveguide switches on said at least two layer is a multitude of said optical waveguide switches integrated onto a single said substrate.

21. An optical switch as per claim 1, wherein said optical switch is an optical scanner.

22. An optical switch as per claim 1, wherein said optical signal is a time modulated optical signal.

23. An optical switch according to claim 22, wherein said micro-mechanical deflectable cantilevered beam mirrors are operably deflected in a predetermined pattern that is synchronous with said time modulated optical signal.

24. An optical switch according to claim 23, wherein said time modulated optical signal is a display signal.

25. An optical switch according to claim 1, wherein said substrate also contains other microelectronics.

26. An optical switch according to claim 24, wherein said microelectronics includes control circuitry for controlling said optical switch.

27. An optical switch according to claim 1, wherein at least part of said optical switch is fabricated using Micro lithography.

28. An optical switch according to claim 1, wherein said substrate is silicon.

29. An optical switch according to claim 28, wherein said silicon top plate is a polyimide film deposited on said substrate.

* * * * *